United States Patent
Tsuda et al.

(10) Patent No.: US 6,839,160 B2
(45) Date of Patent: Jan. 4, 2005

(54) METHOD OF ACTIVATING OPTICAL COMMUNICATION SYSTEM, CHANNEL INCREASING/DECREASING METHOD, AND COMPUTER-READABLE RECORDING MEDIUM

(75) Inventors: Takashi Tsuda, Kawasaki (JP); Kazuo Yamane, Kawasaki (JP); Makoto Murakami, Sapporo (JP); Tooru Shima, Sapporo (JP); Tooru Matsumoto, Kawasaki (JP); Hiroyuki Iwaki, Osaka (JP); Kazuto Imai, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 104 days.

(21) Appl. No.: 10/132,326

(22) Filed: Apr. 26, 2002

(65) Prior Publication Data

US 2002/0154359 A1 Oct. 24, 2002

Related U.S. Application Data

(63) Continuation of application No. PCT/JP00/05912, filed on Aug. 31, 2000.

(51) Int. Cl.⁷ .......................... G02F 1/33; H04B 10/12; H04J 14/02; H01S 3/00
(52) U.S. Cl. ................ 359/337; 359/308; 359/341; 398/9; 398/91; 398/97
(58) Field of Search ............................. 359/177, 161, 359/162, 341, 342, 337, 338, 281; 398/43, 49, 103, 104, 91, 158; 385/24, 27, 32, 37; 370/295, 485, 491, 492

(56) References Cited

U.S. PATENT DOCUMENTS 4,401,364 A 8/1983 Mochizuki (List continued on next page.)

FOREIGN PATENT DOCUMENTS

JP 11-008590 1/1999
JP 11-084440 3/1999

OTHER PUBLICATIONS

Patent Abstracts of Japan of JP 10–173264 dated Jun. 26, 1998.
Patent Abstracts of Japan of JP 11–112434 dated Apr. 23, 1999.
Patent Abstracts of Japan of JP 2000–098433 dated Apr. 7, 2000.
Patent Abstracts of Japan of JP 2000–151515 dated May 30, 2000.
Patent Abstracts of Japan of JP 2000–183818 dated Jun. 30, 2000.
Patent Abstracts of Japan of JP 2000–232433 dated Aug. 22, 2000.

Primary Examiner—Man U. Phan

(57) ABSTRACT

The invention relates to a method of activating an optical communication system comprising a plurality of optical amplifiers having an optical amplifier, between optical transmission lines in which wavelength-division multiplex optical signals are transmitted. The method comprises steps of: generating a desired slope in a desired wavelength range of a gain wavelength curve of the optical amplifier; adjusting an output of the optical amplifier to a desired output level; performing the above two steps in a plurality of optical repeater stations, the steps being carried out in sequence from the first to the last optical repeater stations; and adjusting a level in each optical signal in the wavelength-division multiplex optical signal so as to have substantially constant optical signal-to-noise ratios in the optical signals to be received. Activating the optical communication system according to this procedure allows proper execution of gain slope compensation, output control, and pre-emphasis control.

31 Claims, 16 Drawing Sheets

U.S. PATENT DOCUMENTS

| | | | |
|---|---|---|---|
| 4,616,898 A | | 10/1986 | Hicks, Jr. |
| 4,805,977 A | | 2/1989 | Tamura et al. |
| 4,945,531 A | * | 7/1990 | Suzuki .................... 398/91 |
| 5,050,949 A | * | 9/1991 | DiGiovanni et al. ........ 359/341 |
| 5,808,785 A | * | 9/1998 | Nakabayashi ............... 359/341 |
| 5,825,521 A | * | 10/1998 | Ogawa et al. ............. 359/161 |
| 5,835,259 A | * | 11/1998 | Kakui et al. ................ 359/341 |
| 5,880,874 A | * | 3/1999 | Shibuya et al. ............. 359/337 |
| 6,034,812 A | * | 3/2000 | Naito .................... 359/337.11 |
| 6,144,474 A | * | 11/2000 | Nitta et al. .................. 398/212 |
| 6,172,803 B1 | * | 1/2001 | Masuda et al. ............. 359/341 |
| 6,259,556 B1 | * | 7/2001 | Lutz et al. .................. 359/341 |
| 6,268,954 B1 | * | 7/2001 | Cheng ........................ 359/337 |
| 6,288,836 B1 | * | 9/2001 | Kawasaki et al. ..... 359/341.42 |
| 6,333,807 B1 | * | 12/2001 | Hatayama et al. .......... 359/308 |
| 6,344,914 B1 | * | 2/2002 | Shimojoh et al. ........... 359/177 |
| 6,359,726 B1 | * | 3/2002 | Onaka et al. ............... 359/337 |
| 6,400,497 B1 | * | 6/2002 | Suzuki et al. ............... 359/337 |
| 6,449,074 B1 | * | 9/2002 | Okano et al. ................. 398/91 |
| 6,552,845 B2 | * | 4/2003 | Ishii ........................ 359/337.1 |
| 6,580,857 B1 | * | 6/2003 | King .......................... 385/39 |
| 6,603,596 B2 | * | 8/2003 | Inagaki et al. ............ 359/341.4 |
| 6,628,870 B2 | * | 9/2003 | Yamaguchi ................. 385/123 |

\* cited by examiner

FIG.7

| number of multiplexing | | transmission distance (km) 0~25 | | 25~50 | | 50~75 | | 75~100 | | 100~125 | |
|---|---|---|---|---|---|---|---|---|---|---|---|
| C band | L band | C | L | C | L | C | L | C | L | C | L |
| 1~8 | 1~8 | 0 | 0 | 0.2 | 0.2 | 0.3 | 0.3 | 0.5 | 0.5 | 0.6 | 0.6 |
| | 9~16 | 0 | 0.1 | 0.2 | 0.3 | 0.3 | 0.4 | 0.5 | 0.6 | 0.6 | 0.7 |
| | 17~24 | 0 | 0.2 | 0.3 | 0.4 | 0.4 | 0.5 | 0.6 | 0.7 | 0.7 | 0.8 |
| | 25~32 | 0 | 0.3 | 0.3 | 0.5 | 0.4 | 0.6 | 0.6 | 0.8 | 0.7 | 0.9 |
| 9~16 | 1~8 | 0.2 | 0.1 | 0.3 | 0.2 | 0.4 | 0.3 | 0.6 | 0.5 | 0.7 | 0.6 |
| | 9~16 | 0.2 | 0.2 | 0.3 | 0.3 | 0.5 | 0.4 | 0.6 | 0.6 | 0.7 | 0.7 |
| | 17~24 | 0.2 | 0.3 | 0.4 | 0.4 | 0.6 | 0.5 | 0.7 | 0.7 | 0.8 | 0.8 |
| | 25~32 | 0.2 | 0.4 | 0.4 | 0.5 | 0.7 | 0.6 | 0.7 | 0.8 | 0.8 | 0.9 |
| 17~24 | 1~8 | 0.3 | 0.2 | 0.4 | 0.3 | 0.5 | 0.4 | 0.7 | 0.6 | 0.8 | 0.7 |
| | 9~16 | 0.3 | 0.3 | 0.4 | 0.4 | 0.6 | 0.5 | 0.7 | 0.7 | 0.8 | 0.8 |
| | 17~24 | 0.3 | 0.4 | 0.5 | 0.5 | 0.7 | 0.6 | 0.8 | 0.8 | 0.9 | 0.9 |
| | 25~32 | 0.3 | 0.5 | 0.5 | 0.6 | 0.8 | 0.7 | 0.8 | 0.9 | 0.9 | 1 |
| 25~32 | 1~8 | 0.4 | 0.2 | 0.5 | 0.3 | 0.6 | 0.4 | 0.8 | 0.6 | 0.9 | 0.7 |
| | 9~16 | 0.4 | 0.3 | 0.5 | 0.4 | 0.7 | 0.5 | 0.8 | 0.7 | 0.9 | 0.8 |
| | 17~24 | 0.4 | 0.4 | 0.6 | 0.5 | 0.8 | 0.6 | 0.9 | 0.8 | 1 | 0.9 |
| | 25~32 | 0.4 | 0.5 | 0.6 | 0.6 | 0.9 | 0.7 | 0.9 | 0.9 | 1 | 1 |

FIG.8
A
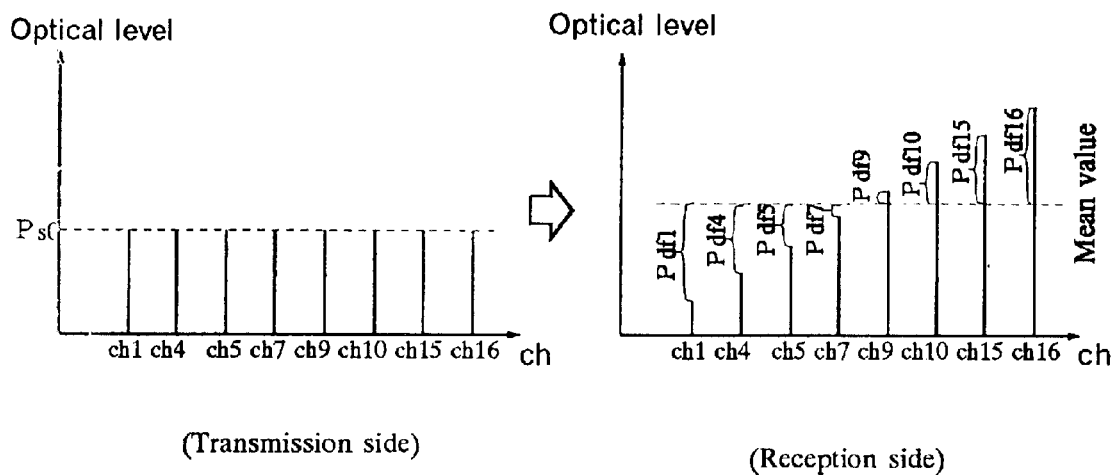
(Transmission side)   (Reception side)
B
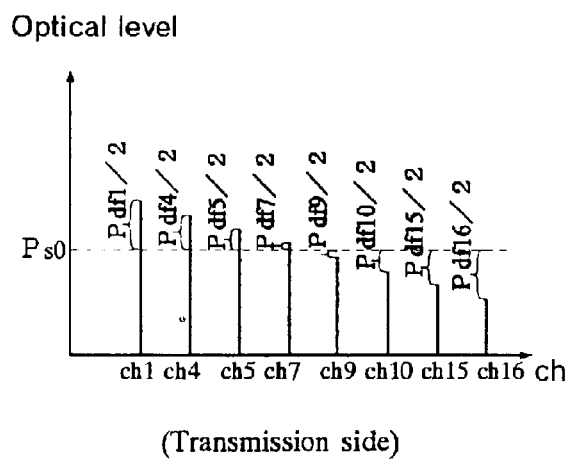
(Transmission side)

Frequency shift (cm⁻¹)

(R.G.Stolen:"Nonlinearity in fiber transmission,"
Proc.IEEE,Vol.68,P1232-1236,1980)

METHOD OF ACTIVATING OPTICAL COMMUNICATION SYSTEM, CHANNEL INCREASING/DECREASING METHOD, AND COMPUTER-READABLE RECORDING MEDIUM

CROSS REFERENCE TO RELATED APPLICATION

This application is a continuation application of International Application PCT/JP00/05912, filed Aug. 31, 2000, and designating the U.S.

BACKGROUND OF THE INVENTION

1. Field of the Invention

This invention relates to an activation method of an optical communication system and a channel increasing/decreasing method. More particularly, this invention relates to an activation method of an optical communication system for executing gain slope compensation, output control and pre-emphasis control, and its channel increasing/decreasing method. This invention further relates to a computer-readable recording medium for causing a computer to execute a program of such an activation method and such a channel increasing/decreasing method.

2. Description of the Related Art

Multi-media communication typified by the Internet has spread drastically in recent years. Research and development of optical communication technologies for achieving ultra-long distance communication and larger capacity communication has been made intensively in the field of communication technologies so as to cope with the drastic increase of traffic due to the drastic spread. Attempts have been made also to improve the speed of time division multiplexing (hereinafter abbreviated as "TDM") transmission and to attain higher density multiplexing of wavelength division multiplexing (hereinafter abbreviated as "WDM") transmission to satisfy the requirement for a greater quantity of traffic.

In the optical communication system for transmitting WDM optical signals, in particular, the WDM optical signals are generated by multiplexing a plurality of optical signals with different wavelengths from each other. Therefore, it is necessary to control amplified spontaneous emission, induced Raman scattering (SRS), or the like, which occurs in the WDM optical signals and has wavelength dependence.

Optical communication systems according to the prior art technology generally include an optical transmission station for generating WDM optical signals for wavelength-division multiplexing a plurality of optical signals having mutually different wavelengths, an optical transmission line in which the WDM optical signals outputted from the optical transmission station are transmitted and an optical reception station for receiving the input WDM optical signals so transmitted, and processing these WDM optical signals. An optical repeater station is inserted into the optical transmission line. A plurality of optical repeater stations may be disposed, whenever necessary. The optical repeater station includes in some cases an optical amplifier for amplifying the WDM optical signals to a predetermined optical level to compensate for the transmission loss occurring in the optical transmission line, and an optical add/drop multiplexer (hereinafter abbreviated as "OADM") in other cases for adding or dropping an optical signal corresponding to a predetermined channel to and from the WDM optical signals.

To elongate the distance between the stations in such an optical communication system, the optical amplifier controls its output optical level at the upper limit optical level at which four-wave mixing and mutual phase demodulation do not occur in the WDM optical signals in the optical transmission line. To control the output optical level, the optical amplifier generally detects the output optical level inclusive of amplifier spontaneous emission (hereinafter abbreviated as "ASE"). Therefore, the amplifier needs to perform peak power control for controlling the output with optical power of ASE taken into account.

There is a limit to transmission distance due to a gain tilt based on a gain as a function of wavelength of the optical amplifier. When optical amplifiers are cascaded to elongate the transmission distance, the gain tilt occurring in each optical amplifier is accumulated. In channels with low optical levels in the WDM optical signals, therefore, an optical signal-to-noise ratio (hereinafter abbreviated as "optical SNR") gets deteriorated, whereas waveforms get deteriorated due to a non-linear optical effect in channels with higher optical levels. Therefore, the same applicant as the that of the present invention proposed a slope compensation method and an apparatus for the method for substantially leveling the gain tilt in Japanese Patent Application Nos. 11-074371 and 2000-051050 that have not yet been laid open. The gain as a function of wavelength is a characteristic curve representing a change of the gain relative to a change of the wavelength in the optical amplifier.

On the other hand, the optical communication system executes pre-emphasis for regulating the optical level in each optical signal in the optical transmission station to equalize the optical SNR in the optical signals (channels) in the WDM optical signals received by the optical reception station. In the optical communication system equipped with OADM, however, pre-emphasis must be executed since the number of optical repeater stations where each optical signal is repeated, is different. Therefore, the applicant of the present invention proposed in Japanese Patent Application No. 2000-009387, that has not yet been laid open, a pre-emphasis method and an apparatus therefor in an optical communication system equipped with OADM.

When the WDM optical signals are arranged in a plurality of wavelength bands, optical power of the WDM optical signals arranged on the shorter wavelength side shifts to the WDM optical signals arranged on the lower wavelength side.

Incidentally, a peak power control amount, a slope compensation amount and a pre-emphasis amount are determined in consideration of common physical phenomena such as ASE, induced Raman scattering, 4-optical wave mixing, self phase modulation, mutual phase modulation, and so forth. Since these amounts depend on one another, the optical communication system which adjusts all the amounts cannot separately determine and adjust them.

It is therefore an object of the present invention to provide a method of activating an optical communication system which executes slope compensation, peak power control, and pre-emphasis in an optimal procedure.

It is another object of the present invention to provide a method of increasing/decreasing the number of channels in an optimal procedure when the channels of WDM optical signals is increased or decreased in number in such an optical communication system.

It is still another object of the present invention to provide a recording medium where a program of activating an optical communication system and increasing/decreasing a channel is recorded.

SUMMARY OF THE INVENTION

The objects of the invention described above can be accomplished by providing a method of activating an optical communication system comprising a plurality of optical repeater stations each having an optical amplifier for amplifying light, between optical transmission lines wherein wavelength-division multiplex optical signals are transmitted. The method comprises: a first step of generating a desired slope in a desired wavelength range of a gain wavelength curve of the optical amplifier; a second step of adjusting an output of the optical amplifier to a desired output level; a third step of performing the first and second steps in a plurality of optical repeater stations, the steps being carried out in sequence from the first to the last optical repeater stations; and a fourth step of adjusting level in each optical signal so as to have substantially constant optical signal-to-noise ratios in the optical signals to be received.

The objects described above can be accomplished by providing a method of increasing or decreasing the number of channels in an optical communication system comprising a plurality of optical repeater stations each having an optical amplifier for amplifying light, between optical transmission lines wherein wavelength-division multiplex optical signals are transmitted. The method comprises: a first step of wavelength-division multiplexing an optical signal corresponding to a channel to be increased or decreased; a second step of generating a desired slope in a desired wavelength range of a gain wavelength curve of the optical amplifier; a third step of adjusting an output of the optical amplifier to a desired output level; and a fourth step of performing the second and third steps in a plurality of optical repeater stations, the steps being carried out in sequence from the first to the last optical repeater stations.

The objects described above can be also accomplished by providing a method of activating an optical communication system including a plurality of optical repeater stations each having a Raman amplifier for supplying pump light which Raman-amplifies light to be inputted and an optical amplifier for amplifying light to be outputted, between optical transmission lines wherein wavelength-division multiplex signals are transmitted. The method comprises: a first step of supplying pump light of the Raman amplifier at a desired level; a second step of generating a desired slope in a desired wavelength range of a gain wavelength curve of the optical amplifier; a third step of adjusting an output of the optical amplifier to a level which is obtained by subtracting a sum of a level of amplified spontaneous emission (ASE) generated by the pump light and a level of ASE occurring in the optical amplifier from a desired output level; a fourth step of adjusting the pump light of the Raman amplifier so that level in each optical signal in the wavelength-division multiplex optical signal after subtraction of a pre-emphasis amount given to each optical signal becomes substantially equal to one another in the optical repeater stations; a fifth step of adjusting an output of the optical amplifier to a level which is obtained by subtracting a sum of a level of ASE generated by the adjusted pump light and a level of ASE occurring in the optical amplifier from the desired output level; a sixth step of performing the first to fifth steps in a plurality of optical repeater stations, the steps being carried out in sequence from the first to last optical repeater stations; and a seventh step of adjusting level in each optical signal in the wavelength-division multiplex signal so as to have substantially constant optical signal-to-noise ratios in the optical signals to be received.

The objects described above can be accomplished by providing a method of increasing or decreasing the number of channels in an optical communication system comprising a plurality of optical repeater stations each having a Raman amplifier for supplying pump light which Raman-amplifies light to be inputted and an optical amplifier for amplifying light to be outputted, between optical transmission lines in which wavelength-division multiplex optical signals are transmitted, comprising: a first step of wavelength-division multiplexing an optical signal corresponding to a channel to be increased or decreased; a second step of generating a desired slope in a desired wavelength range of a gain wavelength curve of the optical amplifier; a third step of adjusting an output of the optical amplifier to a level which is obtained by subtracting a sum of a level of ASE generated by pump light and a level of ASE occurring in the optical amplifier from a desired output level; a fourth step of adjusting pump light of the Raman amplifier so that level in each optical signal in the wavelength-division multiplex optical signal, which is obtained by subtracting a pre-emphasis amount given to each optical signal before the channel increase/decrease, becomes substantially equal to one another in the optical repeater stations; a fifth step of adjusting an output of the optical amplifier to a level which is obtained by subtracting a sum of a level of ASE generated by adjusted pump light and a level of ASE occurring in the optical amplifier from the desired output level; and a sixth step of performing the first to fifth steps in a plurality of the optical repeater stations, the steps being carried out in sequence from the first to last optical repeater stations.

The objects described above can be accomplished by a computer-readable recording medium where a program to be executed by a computer is recorded. The program is used for activating an optical communication system comprising a plurality of optical stations each having an optical amplifier for amplifying light, between optical transmission lines wherein wavelength-division multiplex optical signals are transmitted. The program includes: a first step of generating a desired slope in a desired wavelength range of a gain wavelength curve of the optical amplifier; a second step of adjusting an output of the optical amplifier to a desired output level; a third step of performing the first and second steps in the plurality of optical repeater stations, said steps being carried out from the first to the last optical repeater stations; and a fourth step of adjusting level in each optical signal so as to have substantially constant optical signal-to-noise ratios in the optical signals to be received.

Here, the second step preferably includes a step of subtracting a level of ASE in the optical amplifier from a desired output level. The fourth step preferably includes: a step of creating a plurality of path groups by collecting optical signals which is input to/output from the same positions in the optical transmission; a step of pre-emphasizing a plurality of path groups, each of which is considered a single optical signal; and a step of pre-emphasizing the optical signals in each path group.

A value of slop compensation is fixedly determined from the number of wavelengths, transmission distance, etc, (that is, a value determined feed-forward-wise). Therefore, it is appropriate to execute slope compensation before peak power control and pre-emphasis control.

Since peak power control determines output level of an optical amplifier inside an optical transmission station, an optical repeater station, and an optical reception station, it is appropriate to execute peak power control before pre-emphasis control.

According to the present invention, slope compensation, peak power control, and pre-emphasis can be optimally reliably performed in the optical communication system.

According to the channel increasing/decreasing method described above, slope compensation, peak power control, and pre-emphasis can be optimally reliably performed in the optical communication system even after the channel is increased or decreased.

The present invention can be applied preferably to optical amplification apparatuses and optical communication systems.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 7 shows an example of a table corresponding to a slope compensation amount;

FIG. 8 explains an example of pre-emphasis inside PG;

DESCRIPTION OF THE PREFERRED EMBODIMENTS

Figure 1:
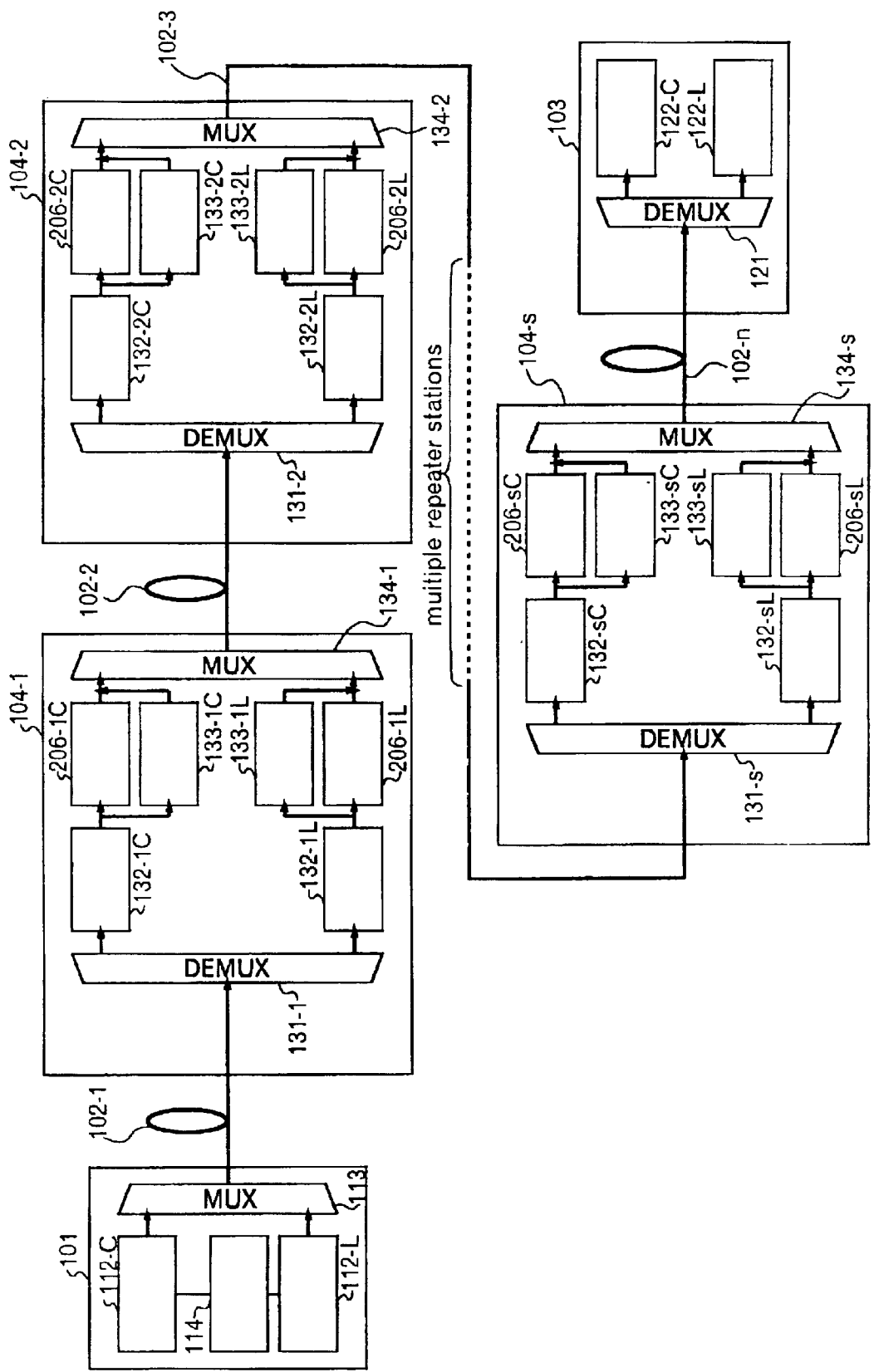
FIG. 1 shows a construction of an optical communication system according to the first embodiment of the present invention.

Preferred embodiments of the present invention will be explained hereinafter with reference to the accompanying drawings. Incidentally, like reference numerals will be used throughout the drawings to identify like constituents, and repetition of explanation of such constituents will be omitted.

[Construction of the First Embodiment]

FIG. 1 shows a construction of an optical communication system according to the first embodiment of the present invention.

Referring to FIG. 1, an optical communication system includes an optical transmission station 101 for generating WDM optical signals of two wavelength bands, an optical transmission line 102 for transmitting the WDM optical signals of the two wavelength bands outputted from the optical transmission station 101, and an optical reception station 103 for receiving and processing the WDM optical signals of the two wavelength bands so transmitted. An optical repeater station 104 is inserted into the optical transmission line 102 in this optical communication system. The number of the optical repeater station 104 may be plural, whenever necessary. Each optical repeater station 104 has an optical amplification function of amplifying the WDM optical signals of the two wavelength bands to a predetermined optical level so as to compensate for the transmission loss occurring in the optical transmission line 102, and an OADM function of adding and dropping optical signals corresponding to predetermined channels to and from the WDM optical signals of the two wavelength bands.

Incidentally, the optical repeater station 104 needs not always have the OADM function. Therefore, the present invention can be applied to an optical communication system in which each repeater station 104 has only the optical amplification function or to an optical communication system in which an optical repeater station (stations) 104 having only the optical amplification function and an optical repeater station (stations) 104 having both optical amplification function and OADM function exist in mixture.

In the WDM optical signals of the two wavelength bands in this embodiment, optical signals of 32 waves having mutually different wavelengths in the C-band (1,530 to 1,570 nm) are wavelength-division multiplexed and optical signals of 32 waves having mutually different wavelengths in the L-band (1,570 to 1,610 nm) are wavelength-division multiplexed. Therefore, the WDM optical signals are wavelength-division-multiplexed signals of 64 waves.

The optical transmission line 102 is an optical fiber, for example. Various optical fibers such as a 1.3 μm band zero dispersion single mode fiber or a 1.5 μm band dispersion shift fiber can be utilized.

Next, a construction of the optical transmission station 101 will be explained.

Figure 2:
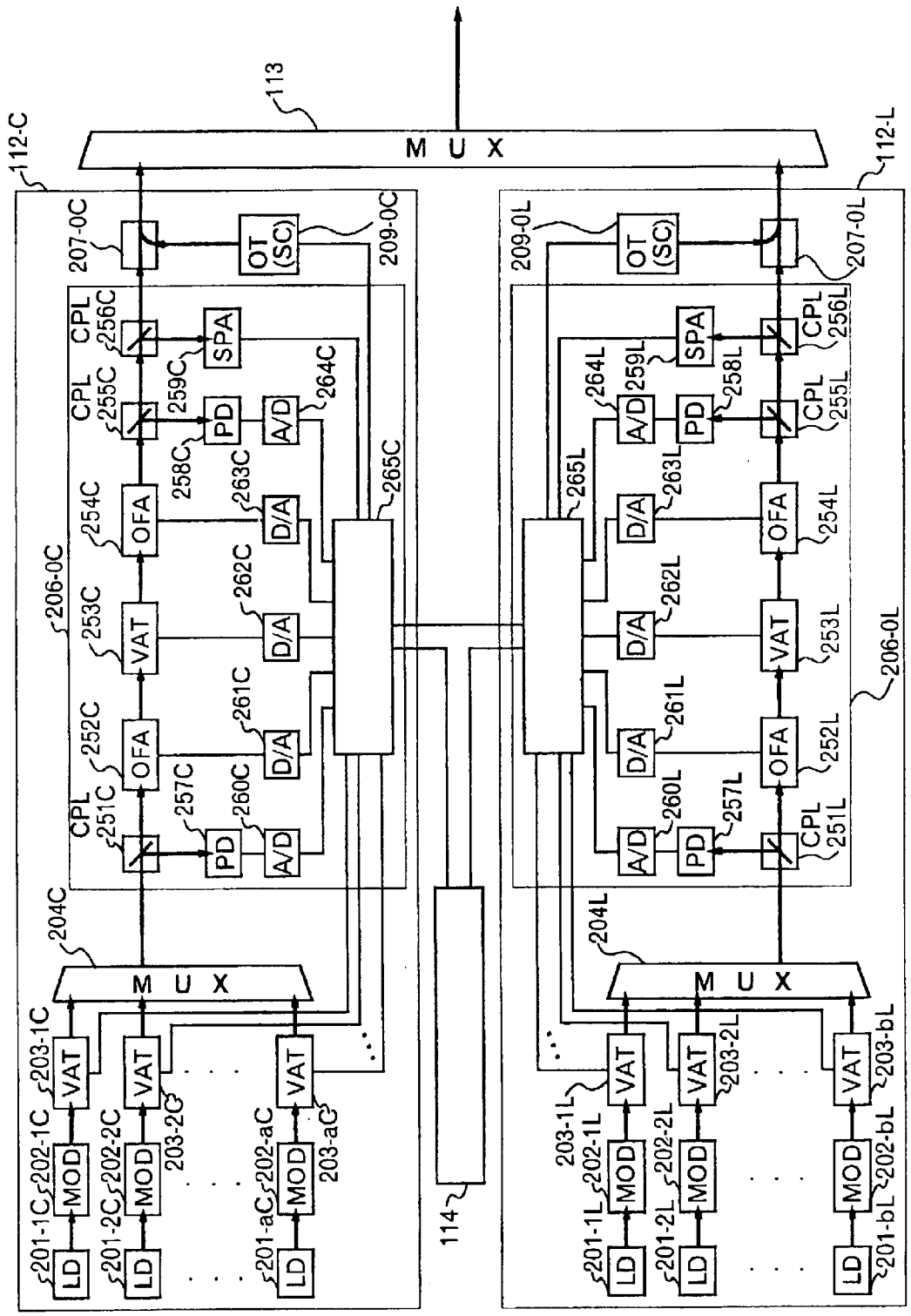
FIG. 2 shows a construction of an optical transmission station in the optical communication system according to the first embodiment.

FIG. 2 shows a construction of the optical transmission station in the optical communication system according to the first embodiment.

Referring to FIGS. 1 and 2, the optical transmission station 101 includes an optical transmission part (C-band) 112-C for generating the C-band WDM optical signals, an optical transmission part (L-band) 112-L for generating the L-band WDM optical signals, an optical multiplexer (hereinafter to be referred to as MUX) 113 for wavelength-division multiplexing the WDM signals of both bands so generated, and a system management part 114 for managing and operating the optical communication system as a whole. The outputs of a MUX 113 are the WDM optical signals of the two wavelength bands.

The optical transmission part (C-band) 112-C and the optical transmission part (L-band) 112-L have substantially the same construction as can be appreciated from FIG. 2.

Therefore, the construction of the optical transmission part (C-band) 112-C will be hereby explained, and only the difference of the optical transmission part (L-band) 112-L from the former will be explained.

Referring to FIG. 2, the optical transmission part (C-band) 112-C includes laser diodes 201-1C to 201-aC, optical modulators 202-1C to 202-aC, variable optical attenuators (hereinafter abbreviated as "VAT") 203-1C to 203-aC, a MUX 204C, an optical amplification part (C-band) 206-0C, an optical multi/demultiplexer (hereinafter abbreviated as "W-CPL") 207-0C and a transmitter 209-0C for generating a management signal as a control signal dedicated to maintenance and management.

The numbers of laser diode 201, optical modulator 202 and VAT 203 correspond to the number of times the C-band WDM optical signals are multiplexed. Since the number of the C-band optical WDM signals is 32 in this embodiment, 32 (a-32) of a laser diode 201, optical modulator 202 and VAT 203 are prepared, respectively.

Each of laser diodes 201-1C to 201-32C is the light source of the optical signal and oscillates a laser beam having a predetermined wavelength. The laser beam so oscillated is outputted to the corresponding MO 202-1C to 202-32C. Each predetermined wavelength corresponds to each channel of the C-band WDM optical signal. For example, the laser diode 201-1C oscillates at a wavelength of the channel 1 and the laser diode 201-2C does at a wavelength of the channel 2. The laser diode can use various lasers such as a Fabry-Perot type laser, a distribution feedback type laser, a distribution Bragg reflection type laser, and so forth.

Each optical modulator 202-1C to 202-32C modulates each laser beam outputted from each laser diode 201-1C to 20-132C in accordance with information to be transmitted, and generates an optical signal corresponding to each channel. Each optical signal so generated is outputted to each VAT 203-1C to 203-32C. The optical modulators can be of external modulation type such as a Mach-Zehnder type and a semiconductor field absorption type.

Incidentally, the optical modulator 202 can be omitted when direct modulation is conducted by superposing a modulation signal based on the information to be transmitted with a driving current of the laser diode 201 to modulate the optical level of the laser beam oscillated.

Each VAT 203-1C to 203-32C attenuates the optical level in the optical signal outputted from each optical modulator 202-1C to 202-32C and outputs the optical signal to the MUX 204C. The attenuation amount is controlled by the signal outputted from the control circuit (C-band) 265C inside the optical amplification part (C-band) 265C. VAT is an optical component capable of attenuating the incident beam and changing its attenuation amount. This VAT may be a variable optical attenuator that adjusts the attenuation amount by inserting an attenuation disc between incident beam and outgoing beam, vacuum evaporating a metal film whose thickness is continuously changed in a rotating direction, onto the surface of the disc to rotate the attenuation disc, or a variable optical attenuator that adjusts the attenuation amount by inserting a magneto-optical crystal between incident beam and outgoing beam, and a polarizer on the outgoing side of this magneto-optical crystal to apply a magnetic field to the magneto-optical crystal and change the intensity of the magnetic field.

To further stabilize the oscillation wavelength of a laser diode 201, the driving current/device temperature of the laser diode 201 may be controlled. A wavelength locker comprising a cyclic filter may well be interposed between the laser diode 201 and optical modulator 202.

The MUX 204C wavelength-division multiplexes each optical signal outputted from each VAT 203-1C to 203-32C, and generates the C-band WDM optical signal. The MUX can use a dielectric multi-layered film filter as one of the interference filters or an arrayed waveguide grating MUX/ demultiplexer, for example.

The resulting C-band WDM optical signal is outputted to W-CPL 207-0C through each optical amplification part (C-band) 206-0C.

On the other hand, the transmitter 209-0C generates, under the control of the control circuit (C-band) 265C, a management signal where necessary information such as maintenance information and condition monitor is stored for transmitting the C-band WDM optical signals in the optical communication system. The management signal includes information such as a transmission distance Lspan, the number of wavelengths (to be multiplexed) m, accumulated ASE level, a pre-emphasis amount of a predetermined optical signal in a predetermined optical repeater station 104, and so forth, that will be described later.

The transmitter 209-0C may include a laser diode and an external optical modulator, for example. The oscillation wavelength of a laser diode exists on a shorter wavelength band side than the channel 1 having the shortest wavelength in the C-band WDM optical signals. This is because the C-band management signal can be disposed outside the wavelength band in which the WDM optical signals of the two wavelength bands are disposed.

W-CPL 207-0C wavelength-division multiplexes the C-band WDM optical signal and the C-band management signal and outputs the multiplexed signal to the MUX 113.

Next, the construction of the optical amplification part (C-band) 206-0C will be explained.

The optical amplification part (C-band) 206-0C includes CPL 251C, 255C and 256C, optical fiber amplifiers (hereinafter abbreviated as "OFA") 252C and 254C, VAT 253C, photo diodes 257C and 258C, a spectrum analyzer 259C, analog/digital converters (hereinafter abbreviated as A/D converter) 260C and 264C, digital/analog converters (hereinafter abbreviated as D/A converter) 261C, 262C and 263C, and a control circuit (C-band) 265C.

The C-band WDM optical signal outputted from the MUX 204C is outputted as the output of the optical amplification part (C-band) 206-0C to W-CPL 207-0C through CPL 251C, OFA 252C, VAT 253C, OFA 254C, CPL 255C and CPL 256C.

CPL 251C is an optical add/drop multiplexer for dividing the input beam into two beams. CPL can be, for example, a fine optical device type optical add/drop multiplexer such as a half mirror, an optical fiber type optical add/drop multiplexer such as a fused fiber, and a optical waveguide type optical add/drop multiplexer. CPL 251C distributes a part of the input C-band WDM optical signals to a photo diode 257C.

The photo diode 257C is a photoelectric converter for generating a current in accordance with optical power of the beam received. The output of the photo diode 257C is outputted to an A/D converter 260C for converting the analog input to the digital output. The output of this A/D converter 260C is inputted to the control circuit (C-band) 265C including a microprocessor for computation and a memory for storing data.

Each OFA 252C and 254C is an optical fiber amplifier for amplifying the beam by means of an optical fiber doped with a rare earth element. The rare earth element is selected in accordance with the wavelength band of the beam to be amplified. To amplify the beam of the C-band, an erbium element is selected. The erbium element is one of the lanthanoid rare earth elements with an atomic symbol Er and an atomic number 68. The elements belonging to the lanthanoids have mutually analogous properties. The rare earth elements for amplifying other wavelength bands include neodymium (Nd, 1,060 nm wavelength band and 1,300 nm wavelength band), praseodymium (Pr, 1,3000 nm wavelength band) and thulium (Tm, 1,450 nm wavelength band).

As OFA absorbs pump light supplied to the optical fiber, the electrons inside the optical fibers are excited, forming thereby inversion distribution. When the WDM optical signal is incident in this inversion distribution state, the WDM optical signal generates induction radiation, so that the WDM optical signal is amplified. The wavelength of pump light is, for example, 1,480 nm and 980 nm in the case of the erbium element.

The control circuit (C-band) 265C adjusts the gain of each OFA 252C, 254C through D/A converters 261C, 263C that convert the digital input to the analog output. The gain of OFA is adjusted when optical power of pump light is adjusted.

VAT 253C attenuates the C-band WDM optical signal amplified by OFA 252C and outputs this signal to OFA 254C. The control circuit (C-band) 265C adjusts the attenuation amount through a D/A converter 262C.

The gain of OFA depends on the wavelength, and the profile of this gain as a function of the wavelength itself depends on the gain. Therefore, the optical amplification part (C-band) 206-0C can substantially level the gain as the function of the wavelength by adjusting the gain of OFA 252C and the gain of OFA 254C, and can further impart a desired tilt to the gain as the function of the wavelength. On the other hand, VAT 253C can adjust the output of the optical amplification part 206-0C to a desired output level.

CPL 255C distributes a part of the input C-band WDM optical signals to a photo diode 258C. After photoelectric conversion, the photo diode 258C outputs its output to the control circuit (C-band) 265C through the A/D converter 264C.

CPL 256C distributes a part of the input C-band WDM optical signals to a spectrum analyzer 259C. The spectrum analyzer 259C is a measuring instrument for measuring the wavelength of the incident beam and the optical level of the wavelength. A spectrum analyzer 250C measures the spectrum of each C-band WDM optical signal as the output of the optical amplification part (C-band) 206-0C and outputs its measurement result to the control circuit (C-band) 265C.

The control circuit (C-band) adjusts the attenuation amount of each VAT 203-1C to 203-32C and imparts pre-emphasis to the C-band WDM optical signal. The control circuit (C-band) 265C judges the input level of the optical amplification part (C-band) 206-0C from the output of the photo diode 257C and judges also the output level of the optical amplification part (C-band) 206-0C from the output of the photo diode 258C. The control circuit (C-band) 265C judges the spectrum in the C-band WDM optical signal from the output of a spectrum analyzer 259C. The control circuit (C-band) 265C adjusts the gains of OFA 252C and 254C in accordance with a following procedure and on the basis of the data such as a later-appearing accumulated ASE level dk, the number of multiplexed optical signals, etc, compensates for the slope for the C-band WDM optical signals, adjusts the attenuation amount of VAT 253C and controls the output level. Here, the control circuit (C-band) 265C also controls peak power when it controls the output level. The control circuit (C-band) 265C outputs information such as the adjustment amount of the optical level in each optical signal generated as a result of pre-emphasis, the slope compensation amount, the peak power control amount, etc, to the transmitter 209-0C to generate a management signal covering the information.

The memory inside the control circuit (C-band) 265C stores the mean level correspondence table, the slope compensation correspondence table, a relational formula to a noise function NF to the input level, a pre-emphasis amount to each optical signal at the time of activation and the increase/decrease of channels, the accumulated ASE level dk at the time of activation and the increase/decrease of the channels, and so forth.

The noise function NF is calculated by a relational formula using the input level. The relational formula is obtained by actually measuring the noise function of the optical amplification part (C-band) 206-0C, conducting approximation by a line graph or approximation of the second order.

It is possible to dispose an optical isolator at any position from CPL 251C to CPL 256C of the optical amplification part (C-band) 206-0C. For example, the optical isolator is interposed between OFA 252C and VAT 253C or between OFA 254C and CPL 255C. The optical isolator is an optical component that passes a beam of light in only one direction, and plays the role of preventing reflected beam occurring at a connection portion of each optical component inside the optical amplification part (C-band) 206-0C from propagating endlessly.

An optical transmission part (C-band) 112-C generates L-band WDM optical signals of 32 waves. This optical transmission part (C-band) 112-C includes likewise laser diodes 201-1L to 201-bL, optical modulator 202-1L to 202-bL, variable optical attenuators 203-1L to 203-bL, a MUX 204L, an optical amplification part (L-band) 206-0L, an optical multi/demultiplexer 207-0L and a transmitter 209-0L.

Here, the wavelengths of the L-band WDM optical signals fall within 1,570 and 1.610 nm bands. Therefore, OFA 252L and 254L use a gain shift/Er-doped optical fiber amplifier. The main difference between the Er-doped optical fiber amplifier and the gain shift/Er-doped optical fiber amplifier is the length of the optical fiber doped with the erbium element. The Er-doped optical fiber has the amplification bands in the 1,550 nm band and the 1,580 nm band. Since the amplification ratio of the 1,580 nm band is smaller than that of the 1,550 nm band, the length of the optical fiber must be elongated about ten times in comparison with the 1,550 nm band optical fiber amplifier in order to accomplish optical amplification in the 1,580 nm band.

To arrange the L-band management signal outside the wavelength band in which the WDM optical signals of the two wavelength bands are arranged, the L-band management signal has its wavelength on the longer wavelength side than the channel 32 as the longest wavelength (corresponding to the channel 64 in the WDM optical signals of the two wavelength bands) in the L-band WDM optical signals.

The MUX 113 wavelength-division multiplexes the C-band WDM optical signal and the L-band WDM optical signal to generate WDM optical signals of the two wavelength bands of 64 waves. These WDM optical signals are outputted to the optical transmission line 102-1 and are then inputted to the optical repeater station 104-1 of the next stage.

The system management part 114 includes an input device such as a keyboard or a mouse, a driver for acquiring data from an external recording medium such a floppy disk drive or a magneto-optical disk drive, a display such as a CRT display, a memory device such as a semiconductor memory, an arithmetic unit such as a microprocessor, and controller for controlling these members. The system management part 114 manages and operates the optical transmission station 101, the optical repeater station 104 and the optical reception station 103 in accordance with the instruction of an operator operating the optical communication system through the control circuit (C-band) 265C and the control circuit (L-band) 265L. The system management part 114 transmits the instruction of the operator to the optical repeater station 104 and to the optical reception station 103 by storing the instruction in the management signal.

Next, the construction of the optical repeater station 104-1 will be explained.

Figure 3:
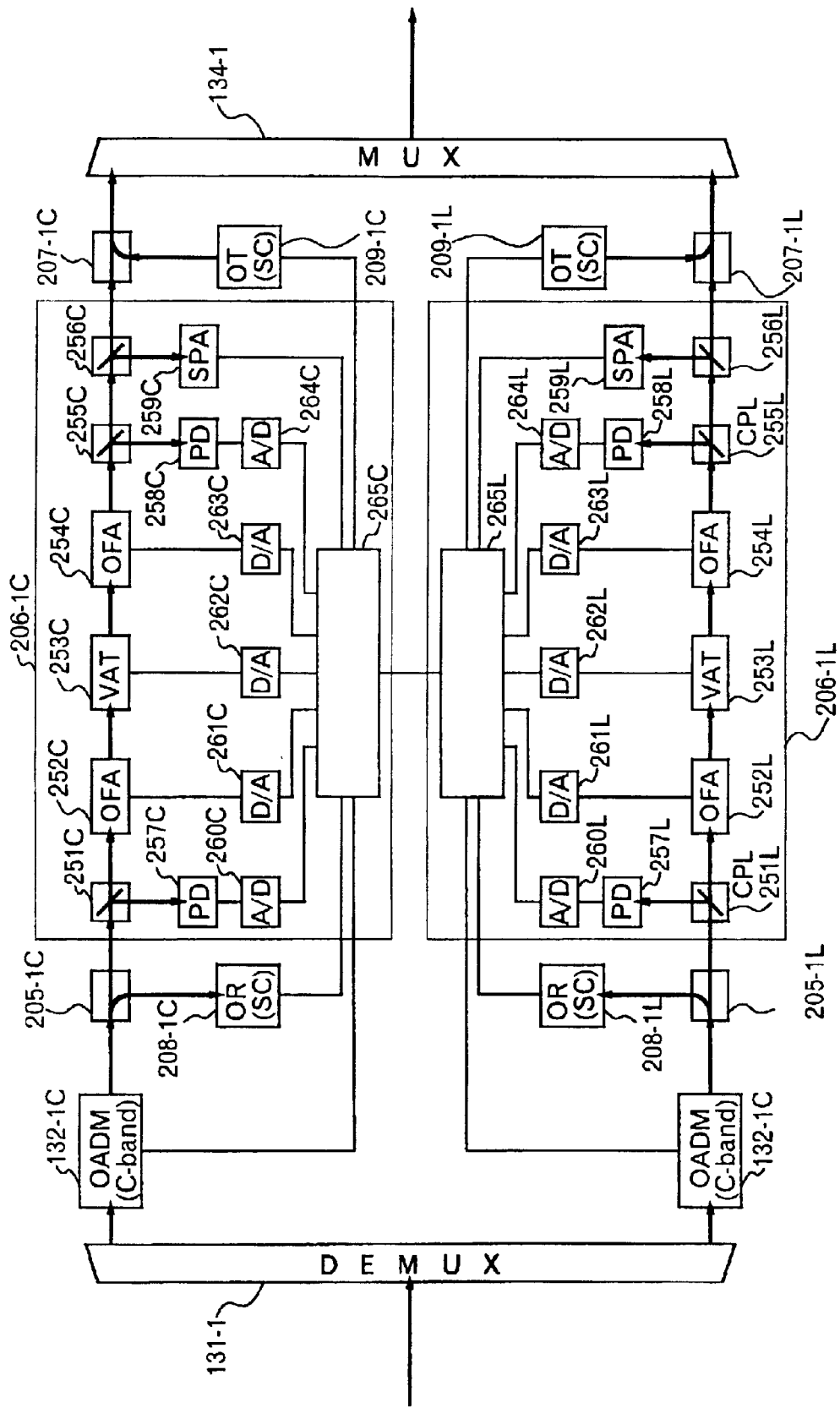
FIG. 3 shows a construction of an optical repeater station in the optical communication system according to the first embodiment.

FIG. 3 shows the construction of the optical repeater station in the optical communication system according to the first embodiment.

Referring to FIGS. 1 and 3, the optical repeater station 104-1 includes a multi/demultiplexer (hereinafter abbreviated as "DEMUX") 131-1 for separating the wavelengths of incident beams, an OADM part (C-band) 132-1C, an OADM part (L-band) 132-1L, an optical amplification part (C-band) 206-1C, an optical amplification part (L-band) 206-1L, a management part (C-band) 133-1C, a management part (L-band) 133-1L and a MUX 134-1.

The WDM optical signals of the two wavelength bands transmitted through the optical transmission line 102-1 are inputted to the DEMUX 131-1 and are wavelength-divided into the WDM optical signal of the C band and the WDM optical signal of the L band.

The C-band WDM optical signal is inputted to the OADM part (C-band) 132-1C. The optical signal corresponding to a predetermined channel is added and/or dropped by the signal from the control circuit (C-band) 265C inside the optical amplification part (C-band) 206-1C. The C-band WDM optical signal outputted from the OADM part (C-band) 132-1C is inputted to W-CPL 205-1C. W-CPL 205-1C outputs the management signal from the C-band WDM optical signals to the optical receiver signal (hereinafter abbreviated as "OR(SC)") for the management 208-1C, and outputs the rest of the signals to the optical amplification part (C-band) 206-1C. OR(SC) 208-1C extracts information such as the adjustment amount, the slope compensation amount, the peak power control amount, the accumulated ASE level and the number of optical signals for the optical level in each optical signal generated as a result of pre-emphasis from the C-band management signal, and outputs the information to the control circuit (C-band) 265C inside the optical amplification part (C-band) 206-1C. The optical amplification part (C-band) 206-1C amplifies the C-band WDM optical signal by using these information, updates the adjustment amount, the slope compensation amount, the peak power controlling amount, the accumulated ASE level and the number of optical signals, and outputs the updating result to the transmitter 209-1C. The transmitter 209-1C generates afresh a C-band management signal on the basis of the updating result and outputs this signal to W-CPL 207-1C. W-CPL 207-1C wavelength-division multiplexes the C-band WDM optical signals amplified by the optical amplification part (C-band) 206-1C to a predetermined level and the updated C-band management signal and outputs the result to the MUX 134-1.

Similarly, the L-band WDM optical signal is inputted to the OADM part (L-band) 132-1L, and the optical signal corresponding to a predetermined channel is added and/or dropped by the signal of the control circuit (L-band) 265L inside the optical amplification part (L-band) 206-1L. The L-band WDM optical signal outputted from the OADM part (L-band) 132-1L is inputted to W-CPL 205-1L. W-CPL 205-1L outputs the management signal from the L-band WDM optical signals to OR(SC) 208-1L and the rest to the optical amplification part (L-band) 206-1L. OR(SC) 208-1L extracts information such as the adjustment amount, the slope compensation amount, the peak power control amount, the accumulated ASE level and the number of optical signals for the optical level in each optical signal generated as a result of pre-emphasis from the L-band management signal, and outputs these information to the control circuit (L-band) 265L inside the optical amplification part (L-band) 206-1L. The optical amplification part (L-band) 265L amplifies the L-band WDM optical signal by using these information, updates the adjustment amount of pre-emphasis, the slope compensation amount, the peak power control amount, the accumulated ASE level and the number of optical signals of this optical repeater station 104-1, and outputs the updating result to the transmitter 209-1L. The transmitter 209-1L generates afresh the L-band management signal on the basis of the updating result and outputs it to W-CPL 207-1L. W-CPL 207-1L wavelength-division multiplexes the L-band WDM optical signal amplified by the optical amplification part (L-band) 206-1L and the updated L-band management signal, and outputs the result to the MUX 134-1.

The MUX 134-1 wavelength-division multiplexes the C-and L-band WDM optical signals, regenerates the WDM optical signals of the two wavelength bands and transmits them to the optical repeater station 102-2 of the next stage through the optical transmission line 102-2.

The optical repeater stations 104-1 to 104-s serially branch/insert predetermined optical signals from and to the WDM optical signals of the two wavelength bands, and amplify and transmit them to the optical reception station 103.

The construction of the optical amplification part (C-band) 206-1C is the same as that of the optical amplification part (C-band) 206-0C described above with the exception that the control circuit (C-band) 265c controls OADM (C-band) 132-1C and OR(SC) 208-1C. Therefore, the explanation of this construction will be omitted. The optical amplification part (L-band) 206-1L, has the same relation as the (L-band) 206-0L, and its explanation will be omitted. The control part (C-band) 133-1C includes W-CPL 205-1C and 207-1C, OR(SC) 208-1C, a transmitter 209-1C and a control circuit (C-band) 265C inside the optical amplification part (C-band) 206-1C. The control circuit (C-band) 265C is used in common for controlling both optical amplification part (C-band) 206-1C and the management part (C-band) 133-1C.

Next, the construction of OADM (C-band) 132-1C will be explained. Incidentally, the construction of OADM (L-band) 132-1L is the same as that of OADM (C-band) 132-1C, and its explanation will be omitted.

Figure 4:
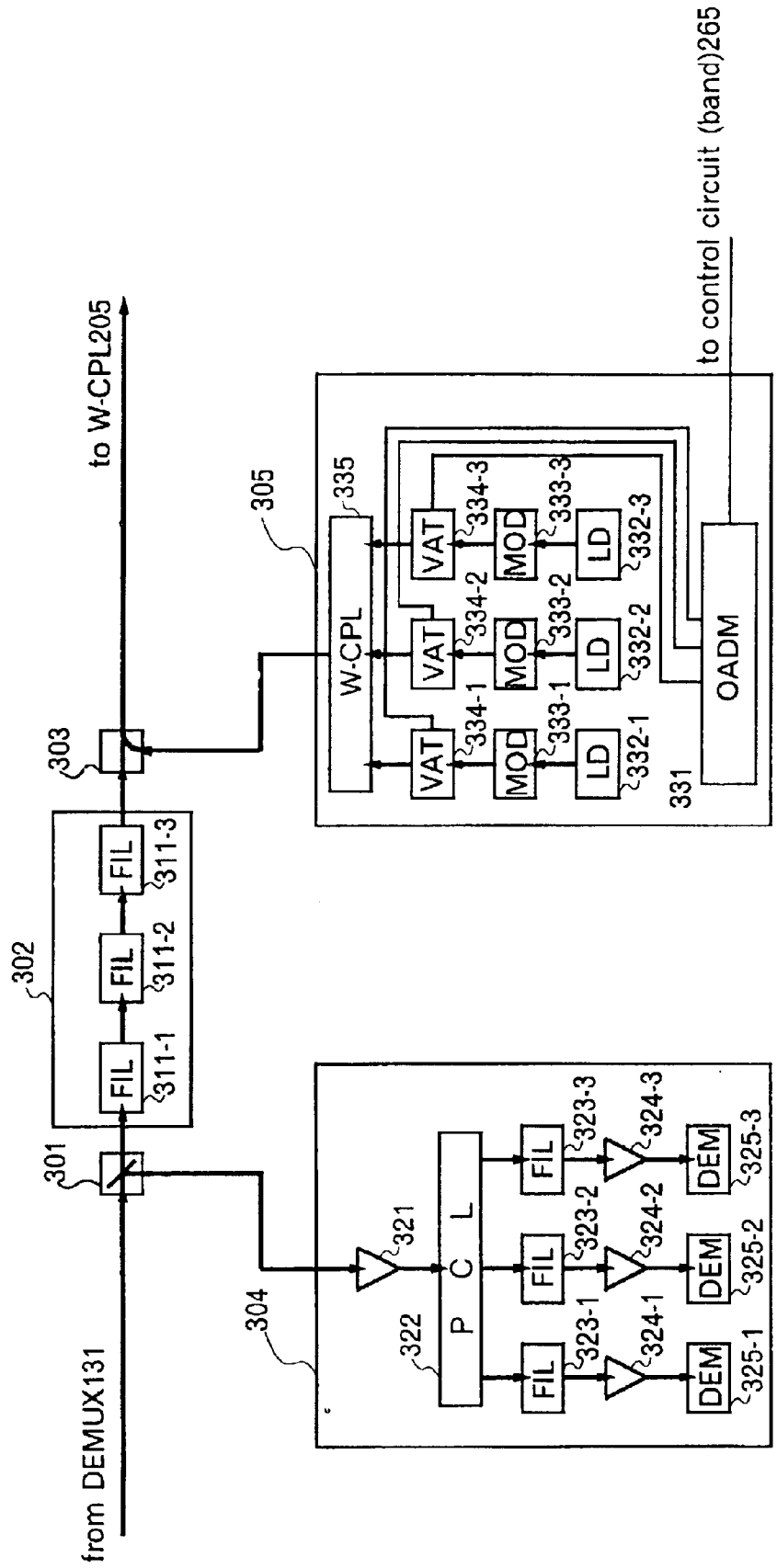
FIG. 4 shows a construction of an OADM part (for one band) in the optical repeater station according to the first embodiment.

FIG. 4 shows the construction of the OADM part (for one band) in the optical repeater station according to the first embodiment.

In FIG. 4, OADM (C-band) 132-1C includes CPL 301, an optical signal removing part 302, W-CPL 303, a dropped optical signal reception circuit 304 and an added optical signal transmission circuit 305.

After band division by DEMUX 131-1, the C-band WDM optical signal is inputted to CPL 301. One of the C-band WDM optical signals distributed by CPL 301 is outputted to the optical signal removing part 302 and the other is inputted to the dropped optical signal reception circuit 304.

The optical signal removing part 302 is an optical component for removing an optical signal corresponding to the channel to be inserted in the optical repeater station 104 from the C-band WDM optical signal. The optical signal removing part 302 includes the same number of optical filters as the number of the channels to be inserted. The optical filters are fiber grating filters, for example, and are cascaded with one another. The pass wavelength bands of the optical filters 311 to 311-3 are in agreement with the wavelengths of the channel to be inserted, respectively. When the channels ch. 4 to ch. 6 are dropped from the C-band WDM optical signals of 32 waves, for example, the pass wavelength band of the optical filter 311-1 conforms with the wavelength of ch. 4, the pass wavelength band of the optical filter 311-2, with the wavelength of ch. 5 and the pass wavelength band of the optical filter 311-3, with ch. 6.

The control circuit (not shown) of the signal removing part notifies the information of the channel removed by the optical signal removing part 302 to the control circuit (C-band) 265C inside the optical amplification part (C-band) 206-1C.

Though the optical filers are cascaded to constitute the optical signal removing part 302 in this embodiment, the optical signal removing part 302 may be acoustico-optical tunable filters (hereinafter abbreviated as "AOTF"). AOTF is an optical component for separating/selecting signals by inducing the change of refractive indices in the optical waveguide by the acuoustico-optical effect and rotating the polarization state of light propagating through the optical waveguide. For example, two optical waveguides are formed on a substrate made of a piezoelectric crystal in AOTF. These optical waveguides cross each other at two positions, and polarizing beam splitters are disposed at these crossing portions. Two electrodes for generating elastic surface waves are formed on the two optical guides between these two crossing portions. The elastic surface wave develops when an RF frequency is supplied to the electrodes, and changes the refractive indices of these two optical waveguides. The wavelengths to be separated/selected are determined as the RF frequency is controlled. When a plurality of wavelengths is to be separated/selected, a plurality of RF frequency is supplied to the electrodes.

Referring to FIG. 4, the C-band WDM optical signals outputted from the optical signal removing part 302 are inputted to W-CPL 303 and are wavelength-division multiplexed with the optical signals generated by the inserted optical signal transmission circuit 205 in W-CPL 303. In consequence, optical signals are inserted afresh and are outputted to W-CPL 205-1C.

The branched optical signal reception circuit 304 receives and processes the optical signal corresponding to a predetermined channel from the WDM optical signals distributed by CPL 301. This reception/processing demodulates the optical signal corresponding to the predetermined channel to extract information, and sends the optical signal to other network when the optical repeater station 104 is connected to the network.

The C-band WDM optical signal outputted from CPL 301 is amplified by the optical amplifier 321 and is divided by CPL 322 to three signals. Each C-band WDM optical signal so distributed is inputted to demodulators 325-1 to 325-3 through the optical filters 323-1 to 323-3 and the optical amplifiers 324-1 to 324-3. the optical filters 323-1 to 323-3 are band-pass optical filters. When the pass wave band of each filter conforms to the wavelength of the channel to be branched, each demodulator 325-1 to 325-3 can receive the optical signal corresponding to the predetermined channel.

When ch. 4 to ch. 6 are branched from the WDM optical signals of 32 waves, for example, the pass wavelength band of the optical filter 323-1 conforms with the wavelength of ch. 4, the pass band wavelength of the optical filter 323-2, with ch. 5, and the pass wavelength band of the optical filter 323-3, with the wavelength of ch. 6.

On the other hand, the inserted optical signal transmission circuit 305 generates the optical signal corresponding to the channel to be inserted in the optical repeater station 104. Here, the channel generated hereby has to be the same as the wavelength of the optical signal removing part 302 described above. However, it need not always be the same channel as the channel received/processed in the branching optical signal reception circuit 304.

Each laser diode 332-1 to 332-3 oscillates a laser beam having a wavelength corresponding to each channel to be inserted. Each laser beam is inputted to optical modulator 333-1 to 333-3 and is modulated according to information to be transmitted. Each optical signal outputted from each optical modulator 333-1 to 333-3 is inputted to VAT 334-1 to 334-3 and is attenuated to a predetermined optical level for pre-emphasis. The control circuit (OADM) 331 adjusts each attenuation amount. The control circuit (OADM) 331 notifies the number of channels inserted and the pre-emphasis amount to the control circuit (C-and) 265C.

Incidentally, the OADM part 132 can arbitrarily set the number of channels to be branched and inserted. In this case, the same number of units each including PLC 322, the optical filters 323-1 to 323-3, the optical amplifiers 324-1 to 324-3 and demodulators 325-1 to 325-3 as the number of channels to be branched are additionally disposed, and CPL for distributing the WDM optical signal outputted from the optical amplifier 321 to each unit is disposed afresh. Units each including laser diodes 332-1 to 332-3, optical modulator 333-1 to 333-3, VAT 334-1 to 334-3 and W-CPL 335 are additionally disposed. The output of each unit is inputted to W-CPL 303 through W-CPL that executes wavelength-division multiplexing.

Next, the construction of the optical reception station 103 will be explained.

Figure 5:
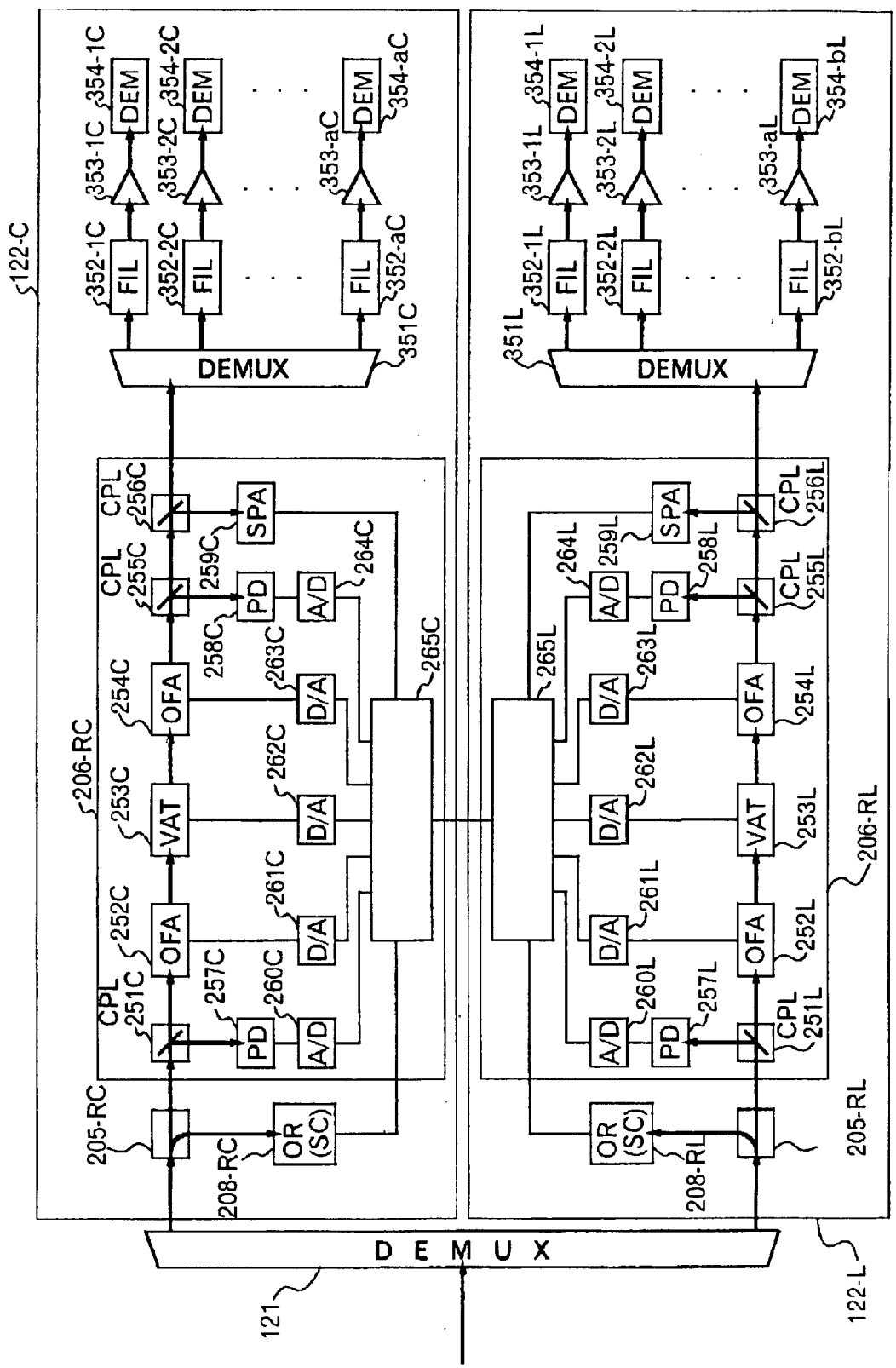
FIG. 5 shows a construction of an optical reception station in the optical communication system according to the first embodiment.

FIG. 5 shows the construction of the optical reception station in the optical communication system according to the first embodiment.

Referring to FIGS. 1 and 5, the optical reception station 103 includes DEMUX 121 for separating the input WDM optical signals of the two wavelength bands into the C-band and the L-band, an optical reception part (C-band) 122-C for receiving and processing the C-band WDM optical signals so separated, and an optical reception part (L-band) 122-L for receiving and processing the L-band WDM optical signals so separated.

Since the optical reception part (C-band) 122-C and the optical reception part (L-band) 122-L have the same construction as shown in FIG. 5, the explanation will be given on only the optical reception portion (C-band) 122-C.

Referring to FIG. 5, the optical reception part (C-band) 122-C includes W-CPL 205-RC, OR(SC) 208-RC, an optical amplification part (C-band) 206-RC, DEMUX 351C, the optical filters 352-1C to 352-aC, optical amplifiers 353-1C to 353-aC and demodulators 354-1C to 354-aC.

The C-band WDM optical signals separated by DEMUX 121 are inputted to W-CPL 205-RC. W-CPL 205-RC outputs the management signal from the C-band WDM optical signal to OR(SC) 208-RC and outputs the rest to the optical amplification part (C-band) 206-RC. OR(SC) 208-RC extracts information such as the adjustment amount for the optical level, the slope compensation amount, the peak power controlling amount, the accumulated ASE level and the number of optical signals for the optical signal generated as a result of pre-emphasis, and outputs these information to the control circuit (C-band) 265C inside the optical amplification part (C-band) 206-RC. The optical amplification part (C-band) 206-RC amplifies the C-band WDM optical signals by using the information. The C-band optical signals amplified by the optical amplification part (C-band) 206-RC to a predetermined level are outputted to DEMUX 351C.

DEMUX 351C wavelength-separates the C-band WDM optical signals into each optical signal corresponding to each channel. The optical signal of each channel so separated is inputted to the optical filters 352-1C to 352-aC.

Each optical filter 352-1C to 352-aC is a band-pass filter that permits the passage of a ray of light having a predetermined wavelength band. When WCPL 351C can accurately wavelength-separate the ray of light of a predetermined wavelength band, however, the optical filters 352-1C to 352-aC can be omitted.

Each optical signal outputted from each optical filter 352-1C to 352-aC is inputted to each demodulators 354-1C to 354-aC through each optical amplifier 353-1C to 353-aC.

To compensate for the loss occurring in DEMUX 351C and the optical filters 352-1C to 352-aC, each optical amplifier 353-1C to 353-aC amplifies the optical signal at a predetermined gain and supplies the optical signal so amplified to each demodulator 354-1C to 354-aC.

Each demodulator 354-1C to 354-aC extracts information from the optical signal. The demodulator includes, for example, a light reception part such as a photo diode, an equalization amplifier for equalizing the output of the light reception part, a timing circuit for extracting the timing from the output of the equalization amplifier, and a discrimination circuit for discriminating the signals from the output of the equalization amplifier at the timing provided by the timing circuit.

Thirty-two (a=32) constructions each including the optical filters 352-1C to 352-aC, the optical amplifier 353-1C to 353-aC and demodulators 354-1C to 354-aC are provided in match with the number of channels of the C-band WDM optical signals. Each optical filter 352-1C to 352-32C is set to the pass wavelength band in match with the wavelength of the corresponding channel.

The optical reception part (L-band) 122-L including W-CPL 205-RL, OR(SC) 208-RL, an optical amplification part (L-band) 206-RL, DEMUX 351L, the optical filters 352-1L to 352-bC, optical amplifiers 353-1L to 353-bL and demodulators 354-1L to 354-bL, receives and processes L-band WDM optical signals of 32 waves.

Here, the construction of the optical amplification part (C-band) 206-RC is the same as that of the optical amplification part (C-band) 206-0C with the exception that the control circuit (C-band) 265C controls OR(SC) 208-RC. Therefore, its explanation will be omitted. The construction of the optical amplification part (L-band) 206-RL has the same relation with that of the optical amplification part (L-band) 206-0L, and its explanation will be omitted.

In the first embodiment, one set of such optical communication systems is disposed between two points. The WDM optical signals of the two wavelength bands are transmitted in both inbound and outbound directions between the two points. As the data is exchanged between the control circuit (C-band) 265C in the inbound direction and the control circuit (C-band) 265C in the outbound direction, the information of the management signal is transmitted in both directions. Similarly, as the data is exchanged between the control circuit (L-band) 265L in the inbound direction and the control circuit (L-band) 265L in the outbound direction, the information of the management signal is transmitted in both directions. The system management part 114 may be provided individually in both inbound and outbound directions, or only one may be provided in both directions.

[Operation and Effects of First Embodiment]

Next, a method of activating an optical communication system when the optical communication system according to the first embodiment is installed afresh or when any change occurs in the optical communication system such as addition of the optical repeater station(s) 104 will be explained.

Figure 6:
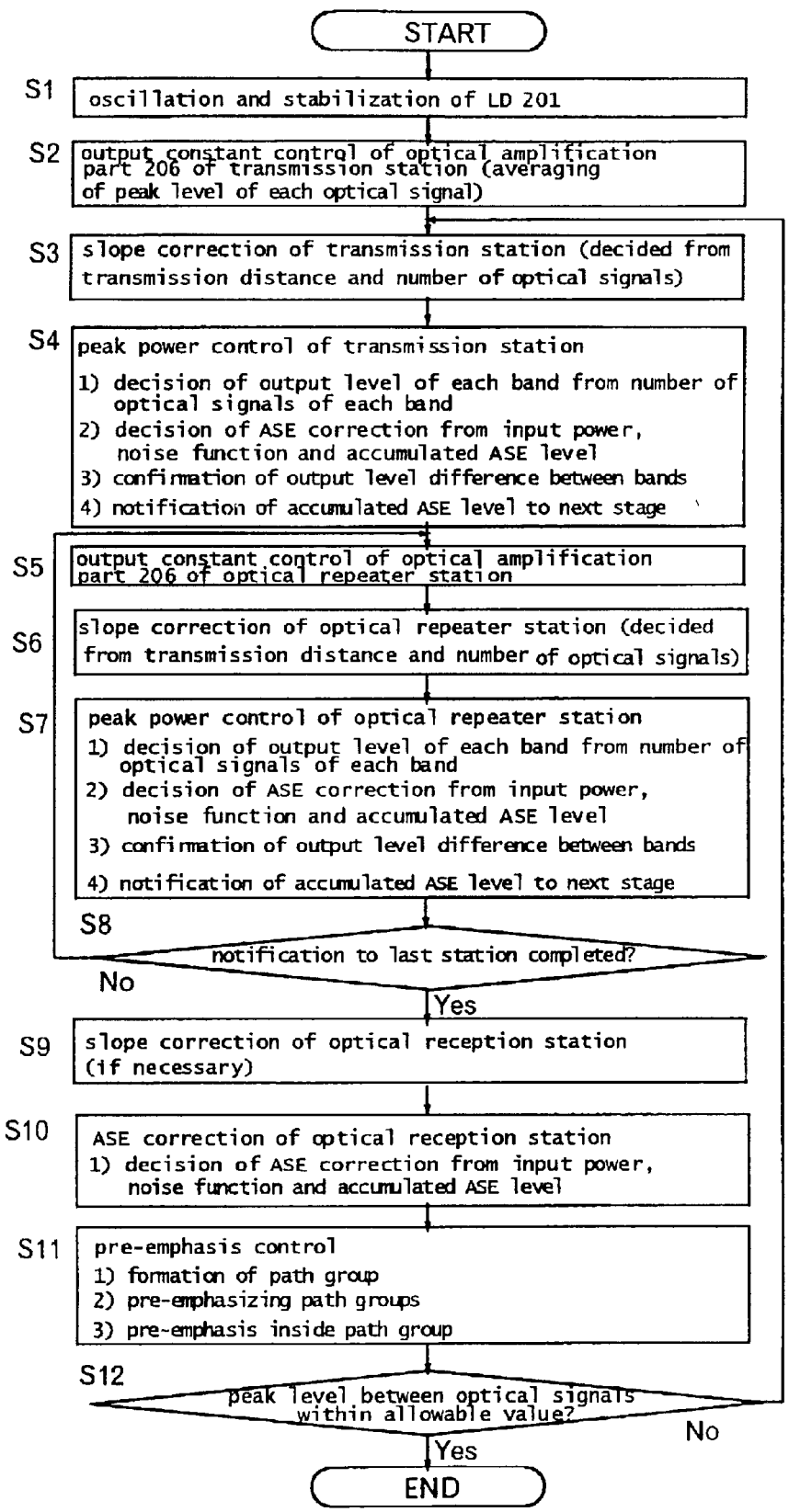
FIG. 6 is a flowchart when the optical communication system according to the first embodiment is activated.

FIG. 6 is a flowchart when the optical communication system according to the first embodiment is activated.

The operator instructs the system management part 114 to activate the optical communication system.

Referring to FIG. 6, the system management part 114 oscillates and stably operates laser diodes 201-1C to 201-aC as the light sources (S1).

Generally, the oscillation wavelength of laser diode deviates from a predetermined value immediately after oscillation due to transient characteristics. The laser diode is allowed to operate stably by stabilizing the device temperature of the laser diode 201 and its driving current.

The system management part 114 gives instruction to the control circuit (C-band) 265C and the control circuit (L-band) 265L. The optical amplification parts 206C and 206L execute constant output control so that the output becomes constant at a certain initial value. The system management part 114 gives the instruction to the control circuit (C-band) 265C and the control circuit (L-band) 265-0L so that optical power of each optical signal (channel 1 to channel 64) in the WDM optical signals of the two wavelength bands becomes substantially equal (S2).

The optical power equalization control is carried out more concretely in the following way.

The control circuit (C-band) 265C sets the attenuation amount of each VAT 203-1C to VAT 203-aC while referring to the spectrum detected by the spectrum analyzer 259C so that the level in each optical signal in the C-band WDM optical signals becomes substantially equal.

The control circuit (L-band) 265-0L sets the attenuation amount of each VAT 203-1L to VAT 203-bL so that the level in each optical signal in the L-band WDM optical signals becomes substantially equal.

In consequence, the levels in the optical signals inside each of the C- and L-bands become substantially equal to one anther.

The system management part 114 gives the instruction to the control circuit (C-band) 265-0C and the control circuit (L-band) 265-0L and executes slope compensation for the WDM optical signals of each of the C- and L-bands (S3).

This slope compensation is carried out more concretely in the following way.

The control circuit (C-band) 265-0C executes slope compensation for the C-band WDM optical signals.

The C-band WDM optical signal generates induced Raman scattering while it propagates through one span from the optical transmission station 101 to the optical repeater station 104-1 of the next stage. Since optical power of the optical signal on the shorter wavelength side inside the C-band WDM optical signals shifts to the optical signal on the longer wavelength side in this instance, optical SNRs differ between the optical signals after transmission. When a slope is applied in advance to optical power of each optical signal in the optical transmission station 101 so that optical power in the shorter wavelength side becomes great and optical power of the optical signal on the longer wavelength side becomes small, the optical SNR can be improved in the optical repeater station 104-1.

Generally a gain as a function of wavelength varies depending on the gain in OFA. The slope compensation can be accomplished by adjusting the gain of OFA 252-0C and the gain of OFA 254-0C so that the gain as a function of wavelength of the optical amplification part (C-band) 112-C can be controlled to a predetermined curve.

When a plurality of bands is transmitted, induced Raman scattering occurs in the bands and the difference of optical SNR changes depending on the number of wavelengths of other bands, the arrangement of the wavelengths and their interval. Therefore, a table made with the parameters taken into account may well be used.

In view of the gap of each optical signal of the WDM optical signals, this embodiment prepares in advance a correspondence table (slope compensation amount table) for each of the transmission distance Lspan of one span and the number of wavelengths (number of multiplexing) m, and stores the table in the memory inside the control circuit (C-band) 265-0C. The control circuit (C-band) 265-0C refers to the slope compensation correspondence table inside the memory on the basis of the transmission distance Lspan and the number of wavelengths m, and decides the slope compensation amount SL. The control circuit (C-band) 265-0C adjusts the gain of OFA 252-0C and the gain of OFA 254-0C so as to attain this slope compensation amount SL, and executes slope compensation for the C-band WDM optical signals.

Next, the slope compensation amount will be explained.

The slope compensation amount SL corresponds to the difference between optical power of the optical signal on the shorter wavelength side and that of the optical signal on the longer wavelength side after transmission when the WDM optical signals, in which optical power of each optical signal is mutually equal, are transmitted through the optical transmission line. Optical power fluctuates in each optical signal of the WDM optical signals due mainly to the loss in optical transmission and induced Raman scattering during transmission.

Therefore, the slope compensation amount SL is given by the following formulas:

$$SL = \frac{\Delta Loss}{\lambda(m) - \lambda(1)} \quad (1)$$

$$\Delta Loss = \Delta T^{fib} - \Delta G^{ram} \quad (2)$$

$$\Delta T_{fib} = (m-1)\Delta \lambda L_{span} \frac{dT_{fib}}{d\lambda} \quad (3)$$

$$\Delta G_{ram} = 10 \log \frac{1 + D_1}{1 - D_1} \quad (4)$$

$$D_1 = \left(\frac{m(m-1)}{2}\right) \times \left(\frac{P\Delta f \gamma p}{1.5 \times 10^{13}}\right) \times \left(\frac{Leff}{2Aeff}\right) \quad (5)$$

Here, ΔTfib is the transmission loss of the optical transmission line, ΔGram is the gain of induced Raman scattering, m is the number of optical signals of the WDM optical signals (number of multiplexing, number of channels), Δλ is the wavelength interval of the optical signals, Lspan is the transmission distance, P is optical power of the optical signal (that is assumed to be equal among all the optical signals), Δf is the frequency interval of each optical signal, γp is a peak gain coefficient as the maximum value of the Raman gain coefficient when triangular approximation is made, Leff is an effective core sectional area of the optical transmission line, Leff is the effective length of the optical transmission line and is given by Leff=(1−exp(−α×Lspan))/α with α representing the loss coefficient of the optical transmission line, λ(1) is the wavelength of the optical signal of the shortest wavelength, and λ(m) is the wavelength of the optical signal of the longest wavelength. FIG. 7 shows an example of the slope compensation amount generated on the basis of the formulas (1) to (5).

Referring to FIG. 6, the control circuit (L-band) 265-0L refers to the slope compensation amount correspondence table inside the memory, adjusts the gains of both OFA 252-0L and 254-0L and executes slope compensation for the L-band WDM optical signals.

The system management part 114 gives the instruction to the control circuit (C-band) 265-0C and the control circuit (L-band) 265-0L and executes peak power control for the C-and L-band WDM optical signals (S4). Peak power control is performed to adjust the mean level in the WDM optical signals in each band and correct ASE in each optical signal.

More concretely, the control is executed in the following way.

The control circuit (C-band) 265-0C controls the output level of the optical amplification part (C-band) 112-C to a predetermined output level by adjusting the attenuation amount of VAT 253-0C while monitoring the output value of the photo diode 258-0C.

The predetermined output level is decided according to the mean level correspondence table that represents the correspondence between type of the optical transmission line 102 connected to the optical transmission station 101 and the output level. The output level is the input level as to the optical transmission line 102. When the optical signal is incident at an input level exceeding a certain value, the optical transmission line 102 causes a non-linear optical effect in the incident optical signal. Therefore, the output level is set substantially at the upper limit value of the input level, which causes the non-linear optical effect. The upper limit value of the input level differentiates according to types of the optical fiber. The mean level correspondence table is prepared because the output level is needed to correspond to a type of the optical transmission line 102.

At the time of a plurality of wavelength band transmission, a mean level correspondence table is prepared, including the number of wavelengths of each wavelength band, the arrangement of wavelengths and the wavelength intervals as parameters together with a type of the optical fiber.

Induced Raman scattering that occurs inside the optical fiber Influences not only inside the band but also between bands. Optical power of the optical signal in the wavelength band on the shorter wavelength side shifts to the optical signal in the wavelength band on the longer wave side. Therefore, when the optical signal is transmitted to the next optical repeater station, the mean level in the optical signal in the wavelength band on the shorter wavelength side, drops, compared with transmission of the optical signal in the single wavelength band.

To suppress the drop in the wavelength band on the shorter wave side, therefore, each wavelength band has different transmission power from each other. More concretely, the optical signal level in the wavelength band on the longer wavelength side is lowered to a lower level than on the shorter wavelength side in order to suppress the shift of power from the shorter wavelength side to the longer wavelength side. The mean level correspondence table is prepared upon consideration of the difference and the output level determined according to a type of the optical fiber described above, for controlling the mean level.

The mean level may be controlled by using both a transmission power difference table for suppressing the shift of power between the wavelength bands and the mean level correspondence table determined in accordance with a type of the optical fibers. It is also possible to perform control by preparing a relational formula to calculate the transmission power difference instead of using the table reference.

Next, the control circuit (C-band) 265-0C corrects the predetermined output level by an amount of the ASE occurring in each optical signal.

As described above, the optical amplification part (C-band) 206-0C amplifies the C-band WDM optical signal so as to attain the predetermined output level. Attainment of the predetermined output level is judged from the output value of the photo diode 258-0C. Here, the optical amplification part (C-band) 206-0C generates ASE as noise and the photo diode 258-0C detects optical power of the WDM optical signals containing ASE. Therefore, even when the optical amplification part (C-band) 206-0C outputs at the predetermined output level, the level in each optical signal in the WDM optical signals becomes lower by an optical power amount of ASE. When optical power of ASE contained in the WDM optical signals is corrected to the predetermined output level, the level in each optical signal of the WDM optical signals can be corrected to the predetermined output level.

The level of ASE depends on the wavelength. The ASE wavelength dependence characteristic depends on the level of the ray of light (input level of the optical amplification part (C-band) 206-0C) to be amplified by the optical amplification part (C-band) 206-0C.

In this embodiment, intervals of optical signals in the WDM optical signals are taken into account to calculate the noise function (NF) of the optical amplification part (C-band) 206-0C from the input level Pin of the optical amplification-part (C-band) 206-0C in accordance with the relational formula. The control circuit (C-band) 265-0C calculates the ASE correction amount on the basis of the input level Pin, the noise function NF, the accumulated ASE level dk and the number of multiplexing m in accordance with various formulas stored in the memory, which will be described later.

The ASE correction amount is of only this optical amplification part (C-band) 206-0C. ASE is accumulated every time the optical amplification part (C-band) 206-0C amplifies the C-band WDM optical signals. Therefore, the level of ASE accumulated till the preceding stage (accumulated ASE level $d_{k-1}$) need to be added. Incidentally, the accumulated ASE level $d_0$ is 0 in the optical transmission station 101 because no preceding stage exists.

Here, the ASE correction amount will be explained.

The output of the kth optical amplifier among a plurality of optical amplifiers cascaded after ASE correction is given by:

$$P_{outA} = P_{out} + \Delta P_{out} \quad (6)$$

$$= m_k P_{ink} G_{AK} + 2h\upsilon n_{spk}(G_{AK} - 1)\Delta f$$

The second item of this formula (6) corresponds to optical power of ASE. Here, $P_{out}$ is output optical power (W) before ASE correction in the optical amplifier, $P_{outA}$ is output optical power (W) after ASE correction in the optical amplifier, $\Delta P_{out}$ is the ASE correction amount, $P_{out}$ is output optical power (W) per wave, $P_{ink}$ is optical power (W) of input light in the kth optical amplifier, $m_k$ is the number of multiplexing of the WDM optical signals inputted to the kth optical amplifier, $G_k$ is the gain before ASE correction in the kth optical amplifier, $G_{AK}$ is the gain after ASE correction in the kth optical amplifier, $n_{spk}$ is a spontaneous emission function in the kth optical amplifier, hv is energy (J) of photons, and $\Delta f$ is the amplification band (Hz) of the optical amplifier.

Since $\Delta k = \Delta P_{OUT}/P_{OUT}$ and ASE of the (k-1)th optical amplifier is accumulated to the kth optical amplifier, $$\Delta_k = \sum_{j=1}^{k} \Delta \Gamma_j = \sum_{j=1}^{k} \frac{2h\upsilon n_{spi}\Delta f}{m_k P_{inj}} \quad (7)$$

$$= \frac{h\upsilon \Delta f}{m_k} \sum_{j=1}^{k} \frac{2n_{spi}}{P_{inj}}$$

$$= \frac{h\upsilon \Delta f}{m_k} \sum_{j=1}^{k} C_j$$

$$= \frac{h\upsilon \Delta f}{m_k} d_k$$

$$C_j = \frac{2n_{spi}}{P_{inj}} \quad (8)$$

$$d_k = \sum_{j=1}^{k} \frac{2n_{spi}}{P_{inj}} \quad (9)$$

$$N_{spk} = \frac{1}{2} 10^{NF_k/10} \quad (10)$$

Referring to FIG. 6, the control circuit (C-band) 265-0C adds the ASE level occurring in the optical amplification part 206-1C to the accumulated ASE level of the preceding stages extracted from the management signal and calculates the final ASE correction amount. The control circuit (C-band) 265-0C adds or subtracts the predetermined output level with reference to this final ASE correction amount. The control circuit (C-band) 265-0C adjusts the attenuation amount of VAT 253-0C so as to attain the predetermined output level added or subtracted in this way, and executes ASE correction for the C-band WDM optical signals.

It is also possible to conduct ASE correction by adjusting power of pump light incident into OFA 252C and OFA 254C and adjusting the respective gains, instead of adjusting the attenuation amount of VAT 253-C.

In the above description, the correction circuit (C-band) 265-0C determines the predetermined output level for adjusting the level to the mean level and conducts ASE correction for this predetermined output level. However, the control circuit (C-band) 265-0C may conduct peak power control by adding or subtracting the ASE correction amount to/from the predetermined output level to obtain a collective value and adjusting the attenuation amount of VAT 253-0C.

The control circuit (C-band) 265-0C refers to the output of the photo diode 258-0C and confirms whether or not required peak power control is made.

It is possible to measure the input level of each band by the input monitor of the next optical repeater station and to execute feedback control, as peak power control, so that the input level of each band reaches a predetermined value.

The control circuit (C-band) 265-0C updates the value of the accumulated ASE level $d_k$ by the ASE correction amount obtained by its own optical amplification part (C-band)

206-0C, stores the accumulated ASE level $d_k$ so updated in the memory and notifies the updated value to the transmitter 209-0C.

Similarly, the control circuit (L-band) 265-0L refers to the mean level correspondence table and the ASE correction correspondence table inside the memory, adjusts the attenuation amount of VAT 253-0L and controls peak power for the L-band WDM optical signals. The control circuit (L-band) 265-0L updates the value of the accumulated ASE level $d_k$ and notifies the updated value to the transmitter 209-0L.

The control circuit (C-band) 265-0C and the control circuit (L-band) 265-0L inside the optical transmission station 101 notify the completion of slope compensation and peak power control to the system management part 114.

Receiving the notification, the system management part 114 judges the completion of slope compensation and peak power control for the first span that is between the optical transmission station 101 and the optical repeater station 104-1. The system management part 114 then gives the instruction of performing slope compensation and peak power control for the second span, which is between the optical repeater station 104-1 and the optical repeater station 104-2, to the optical repeater station 104-1 by the management signal.

Receiving the notification, the control circuit (C-band) 265C and the control circuit (L-band) 265L inside the optical repeater station 104-1 control the optical amplification part 206C and the optical amplification part 206L (S5) to have constant output.

Next, the control circuit (C-band) 265-1C and the control circuit (L-band) 265-1L inside the optical repeater station 104-1 similarly execute slope compensation (S6) and peak power control (S7). The control circuit (C-band) 265-1C and the control circuit (L-band) 265-1L inside the optical repeater station 104-1 notify the completion of slope compensation and peak power control to the system management part 114 by the management signal.

Receiving the notification, the system management part 114 judges the completion of slope compensation and peak power control for the second span, which is between the optical repeater station 104-1 and the optical repeater station 104-2. The system management part 114 gives the instruction of switching output constant control (S5) of OFA 252 and 254 and executing slope compensation (S6) and peak power control (S7) to the optical repeater station 104-2 for the third span between the optical repeater station 104-2 and the optical repeater station 104-3 by the management signal.

Switching output constant control of OFA 252 and 254 (S5), slope compensation (S6) and peak power control (S7) are executed in the first to the last spans in sequential order (the span between the optical repeater station 104-s and the optical reception station 103) (S8).

Finally, the control circuits 265C and 265L inside the optical reception station 103 execute slope compensation in the same way as described above, whenever necessary (S9), and then execute peak power control. However, only ASE correction is executed in peak power control (S10).

The system management part 114 receives the management signal containing information representing that slope compensation and peak power control are completed to the final span. The system management part 114 then executes pre-emphasis for each optical signal in the WDM optical signals of the two wavelength bands (S11).

When an optical repeater station or stations equipped with OADM exist in the optical communication system, each optical signal (each channel) of the WDM optical signals sent from the optical transmission station is not always transmitted to the optical reception station. Therefore, the optical signals transmitted from the same station (optical transmission station and optical repeater station) and received by the same station (optical reception station and optical repeater station) are collected to be one group in each band. This group will be hereinafter called a "path group" (abbreviated as "PG").

For example, channels 1 to 6 and channels 30 to 37 are transmitted from the optical transmission station 101 and are received by the optical reception station 103. Channels 7 and 8 are transmitted by the optical transmission station 101 and are received by the optical reception station 104-2. Channels 38 to 43 are transmitted from the optical transmission station 101 and are received by the optical repeater station 104-4. Channels 9 and 10 are transmitted from the optical repeater station 104-2 and are received by the optical reception station 103. Channels 11 to 29 and channels 44 to 51 are transmitted from the optical repeater station 104-2 and are received by the optical repeater station 104-5. Channels 52 to 64 are transmitted from the optical repeater station 101-4 and are received by the optical reception station. In such a case, the path group is collected in each band. Therefore, the channels 1 to 6 and the channels 30 to 32 are grouped to a path group C-band PG-C1. The channels 7 and 8 are grouped to a path group C-band PG-C2. The channels 9 and 10 are grouped to a path group C-band PG-C3. The channels 11 to 29 are grouped to a path group C-band PG-C4. The channels 33 to 37 are grouped to a path group L-band PG-L1. The channels 38 to 43 are grouped to a path group L-band PG-L2. The channels 44 to 51 are grouped to a path group L-band PG-L3. The channels 52 to 64 are grouped to a path group L-band PG-L4.

When the concept of such path groups is considered, in the optical communication system with OADM pre-emphasis can be divided into the first step of conducting pre-emphasis between the path groups and the second step of conducting pre-emphasis inside the path group.

First, the system management part 114 determines the pre-emphasis amount of the path groups in the following way.

The system management part 114 determines partial optical SNR in each optical repeater station 108 and each optical reception station 108. The partial optical SNR is given by:

$$(Pout_{j,k})/NF_{j,k}G_{j,k}h\nu\Delta f \tag{11}$$

Here, $Pout_{j,k}$ is the optical level when the channel j is emitted from the kth optical repeater station 104-k, $NF_{j,k}$ is a noise function of the channel j in the kth optical repeater station 104-k, $G_{j,k}$ is the gain of the channel j in the kth optical repeater station 104-k, $\nu$ is the frequency corresponding to the wavelength of the optical signal, and $\Delta f$ is the frequency corresponding to resolution of the optical SNR. The partial optical SNR may be defined as $Pout_{j,k}/G_{j,k}$, $Pout_{j,k}$ or $Pin_{j,k}$.

The system management part 114 determines the sum of the partial optical SNR in all the optical signals amplified by each optical repeater station 108 and by each optical reception station 108, and further determines an all-optical signal mean value as the mean value of all the optical signals.

The system management part 114 determines the sum of the partial optical SNR in all the optical signals inside PG amplified in each optical repeater station 108 and each optical reception station 108, and further determines PG partial optical SNR as their mean value.

The system management part 114 determines the difference between the all-optical signal mean value and the PG partial optical SNR in each optical repeater station 108 and in each optical reception station 108 for each PG.

The system management part 114 determines the sum of difference values for each PG.

The system management part 114 adjusts the PG partial optical SNR for each PG so that the sum of the difference values so determined becomes zero.

To sump up, the level in each optical signal may be adjusted so as to satisfy the following relation (12):

$$\begin{pmatrix} \sum_{j=1}^{\text{all channel}} (\text{partial optical } SNR_{1,k}\text{-all-optical signal mean value}_{1,k}) \\ \sum_{j=1}^{\text{all channel}} (\text{partial optical } SNR_{2,k}\text{-all-optical signal mean value}_{2,k}) \\ \vdots \\ \sum_{j=1}^{\text{all channel}} (\text{partial optical } SNR_{m1,k}\text{-all-optical signal mean value}_{m1,k}) \\ \sum_{j=1}^{\text{all channel}} (\text{partial optical } SNR_{m,k}\text{-all-optical signal mean value}_{m1\,k}) \end{pmatrix} = 0 \quad (12)$$

Here, when the channel j is amplified by the kth optical repeater station 104-k, the all-optical signal mean value j,k is obtained by determining the partial optical SNR for all the optical signals amplified by the kth optical repeater station 104-k and calculating their mean value. When the channel j is not amplified by the kth optical repeater station 104-k, on the other hand, the all-optical signal mean value j,k is zero. Therefore, when the channel j is not amplified by the kth optical repeater station 104-k, (partial optical SNRj,k-all-optical signal mean value j,k)=0.

The system management part 114 adjusts the optical level of PG on the basis of the PG partial optical SNR thus adjusted, and pre-emphasizes the path groups.

Next, the system management part 114 pre-emphasizes optical signals in each PG. Pre-emphasis inside a path group can be attained in the following way, for example.

FIG. 8 is a diagram useful for explaining an example of Pre-emphasis inside a path group.

FIG. 8A shows spectra on the transmission side when Pre-emphasis inside a path group is not made (after pre-emphasizing the path groups) and spectra on the reception side. FIG. 2B shows spectra when Pre-emphasis inside a path group is conducted on the basis of FIG. 2A. The ordinate in these diagrams represents the optical level and the abscissa does the channel (ch).

FIG. 8 shows the case where PG comprises ch1, ch4, ch5, ch7, ch9, ch10, ch15 and ch16. However, pre-emphasis inside a path group can be conducted irrespective of combination of channels.

To simply conduct pre-emphasis, pre-emphasis inside a path group is executed in the following way. The difference (Pdf) from the mean value of the optical level in each channel on the reception side is set to ½, and the relative size of the ½ difference (Pdf/2) is inversed between the spectra. The resulting value is added to, and subtracted from, each channel on the transmission side after pre-emphasizing the path groups as the pre-emphasis inside a path group amount.

As to ch1, for example, the optical level in ch1 is smaller than the mean value of the optical level on the reception side. Therefore, Pdf1/2 is added to the mean value of the optical level on the transmission side. As to ch16, the optical level in ch16 is greater than the mean value of the optical level on the reception side. Therefore, Pdf16/2 is subtracted from the mean value of the optical level on the transmission side.

In this way, the system management part 114 executes pre-emphasis inside a path group and calculates the pre-emphasis amount in each optical signal.

The system management part 114 adjusts each VAT 203 inside the optical transmission station 101 and each VAT 334 inside the insertion optical signal transmission circuit 305 of the optical repeater station 104 so that each optical signal attains a predetermined level with the pre-emphasis amount taken into consideration. Here, the system management part 114 adjusts each VAT 334 by the management signal.

The system management part 114 measures the peak level in each optical signal. The output power monitor 258 of the optical amplification part 206 measures the total output of the optical amplification part. The ASE correction amount is subtracted from this value. The output mean level is calculated by dividing this balance by the total number of channels. The difference from the mean value of each optical signal measured by the spectrum analyzer 259 is added to calculate the peak level in each optical signal. When the peak level in each optical signal exceeds an allowable value, necessary controls, first from peak power control, are sequentially re-executed in the optical transmission station 101. When the peak level is within the allowable value, the activation processing is complete, and the operation of the optical communication system is started (S12).

Since in the first embodiment, the optical communication system is activated as described above, it can optimize slope compensation, peak power control and pre-emphasis. Therefore, the optical communication system according to the second embodiment can equalize the optical SNR in each optical signal in the WDM optical signals of the two wavelength bands, which enables long distance transmission.

Next, the explanation will be given on the method of increasing or decreasing the number of multiplexing (the number of channels) in the WDM optical signals of the two wavelength bands in the optical communication system according to the first embodiment.

Figure 9:
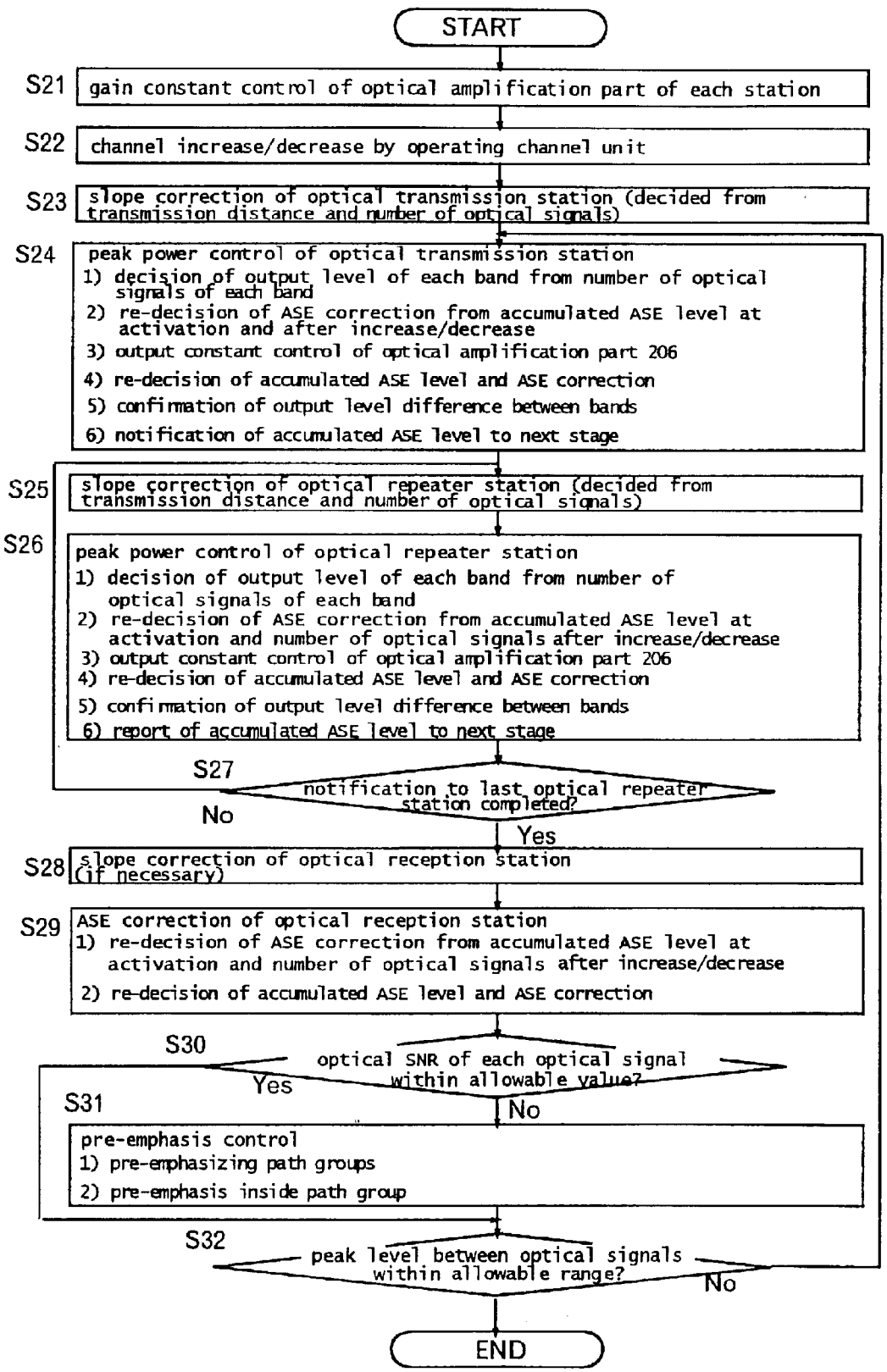
FIG. 9 is a flowchart of increasing or decreasing channels in the optical communication system according to the first embodiment.

FIG. 9 is a flowchart when the number of channels is increased or decreased in the optical communication system according to the first embodiment.

To increase (decrease) the channels, the operator adds (subtracts) a channel unit comprising a laser diode 201, optical modulator 202 and VAT 203 to the MUX 204.

The operator instructs the system management part 114 to increase (decrease) the channels of the optical communication system.

The system management part 114 instructs all the control circuits (C-band) 265C and control circuits (L-band) 265L to operate all the optical amplification parts (C-band) 206C and optical amplification parts (L-band) 206L inside the optical transmission station 101, the optical repeater station 104 and the optical reception station 103 at a predetermined constant gain (gain constant control) (S21). Incidentally, the system management part 114 gives the instruction to the optical repeater station 104 and the optical reception station 103 through the management signal. The predetermined constant gain is, for example, a value at which the gain as a function of wavelength of the optical amplification part 206 becomes substantially flat.

The system management part 114 operates the channel unit for increasing (decreasing) the channels (S22). The system management part 114 detects back power of the laser diode through a light reception device (not shown), or the like. The channel is preferably increased after the stable operation of the laser diode 201 of the channel unit so increased is confirmed. Switching of increasing or decreasing can be made by means such as adjustment of the attenuation amount of VAT 203 for the channel unit to be increased or decreased, operation/non-operation of optical modulator 202 or insertion of an optical switch between the MUX 204 and VAT 203.

After the channels are thus increased (decreased), the system management part 114 updates the management signal by the new number of multiplexing and accommodates the instruction to execute slope compensation and peak power control in the management signal.

The system management part 114 notifies this management signal to the optical transmission station 101, the optical relay station 104 and the optical reception station 103.

In the case of the increase (decrease) of the channels, slope compensation of the optical transmission station 101 (S23) is conducted in the same way as the case of activation (S3).

When the number of channels increases (decreases), optical power of the C-band WDM optical signals increases (decreases). In consequence, the induced Raman scattering effect changes. Therefore, the control circuit (C-band) 265-0C updates the predetermined output level before the increase in a predetermined output level corresponding to the new number of channels. The control circuit (C-band) 265-0C adjusts the attenuation amount of VAT 253-0C while monitoring the output value of the photo diode 258-0C, and re-controls the output level of the optical amplification part (C-band) 112-C to the updated predetermined output level.

The control circuit (C-band) 265-0C recalculates a temporary ASE correction amount on the basis of the new channel number and the updated predetermined output level. The control circuit (C-band) 265-0C corrects the predetermined output level by the temporary ASE correction amount.

Similarly, the control circuit (L-band) 265-0L re-adjusts the output level of the optical amplification part (L-band) 112-L to the updated predetermined output level. The control circuit (L-band) 265-0L calculates a temporary ASE correction amount and corrects the predetermined output level by this temporary ASE correction value.

The control circuit (C-band) 265-0C switches the optical amplification part (C-band) 206-0C to the output constant control at the output level under this condition, and the control circuit (L-band) 265-0L, switches the optical amplification part (L-band) 206-0L to the output constant control at the output level under this condition.

The control circuit (C-band) 265-0C recalculates the accumulated ASE level dk and the ASE correction amount, and corrects the predetermined output level by the ASE correction amount after re-calculation.

The correction circuit (C-band) 265-0C refers to the output of the photo diode 258-0C and confirms whether or not required peak power control is performed.

The control circuit (C-band) 265-0C updates the value of the accumulated ASE level dk by the ASE correction amount made at its own optical amplification part (C-band) 206-0C, stores the updated accumulated ASE level $d_k$ in the memory and notifies it to the transmitter 209-0C.

Similarly, the control circuit (L-band) 265-0L recalculates the accumulated ASE level $d_k$ and the ASE correction amount, and corrects the predetermined output level by the ASE correction amount after re-calculation. The control circuit (L-band) 265-0L updates the value of the accumulated ASE level $d_k$ and notifies it to the transmitter 209-0L.

Both control circuits (C-band) 265-0C and 265-0L inside the optical transmission station 101 notify the system management part 114 of the completion of slope compensation and peak power control.

Receiving this notice, the system management part 114 judges the completion of slope compensation and peak power control for the first span between the optical transmission station 101 and the optical repeater station 104-1.

The system management part 114 conducts slope compensation (S25) and peak power control (S26) in all the spans in the same way as the steps S23 and S24 described above. S25 and S26 are performed in sequence from the first to the last spans.

Finally, the control circuits 265C and 265L in the optical reception station 103 execute slope compensation in accordance with the number of optical signals after the increase/decrease (S28). The temporary ASE correction amount is calculated from the accumulated ASE level at the time of activation, and the predetermined output level is corrected by this temporary ASE correction amount. The operation is switched under this condition to the output constant operation. Thereafter, the control circuits 265C and 265L recalculate the accumulated ASE level dk and the ASE correction amount, and correct the predetermined output level by the ASE correction amount after re-calculation (S29).

The system management part 114 receives the management information containing the information that slope compensation and peak power control are completed till the final span, and executes pre-emphasis for each optical signal in the WDM optical signals of the two wavelength bands.

The system management part 114 receives the spectra in the WDM optical signals of the two wavelength bands from the optical transmission station 103, and judges the optical SNR in each optical signal from the spectrum (S30). When a difference between the optical SNRs in the optical signals is within a predetermined allowable range, the system management part 114 does not execute pre-emphasis again. When the difference exceeds the predetermined allowable value, on the other hand, the system management part 114 re-executes pre-emphasis in the same way as the activation processing of the optical system (S31).

The system management part 114 calculates the optical signal peak level and judges whether or not the value is allowable, in the same way as the activation processing. When the value exceeds the allowable value, the system management part 114 serially re-executes control from peak power control of the optical transmission station 101. When the value is with in the allowable value, the system management part 114 completes the channel increasing/decreasing processing and starts the operation of the optical communication system (S32).

In the first embodiment, the channels are increased (decreased) as described above, which allows proper execution of slope compensation, peak power control, and pre-emphasis.

Next, another embodiment will be explained.

[Construction of Second Embodiment]

The second embodiment pertains to a form of the optical communication system according to the present invention.

The optical communication system of the second embodiment is mainly different from the optical communication system of the first embodiment in that it comprises an optical reception station 107 and an optical repeater station 108 each being equipped with a Raman amplification part (hereinafter abbreviated as "RA") for conducting Raman amplification in the optical transmission line.

Figure 10:
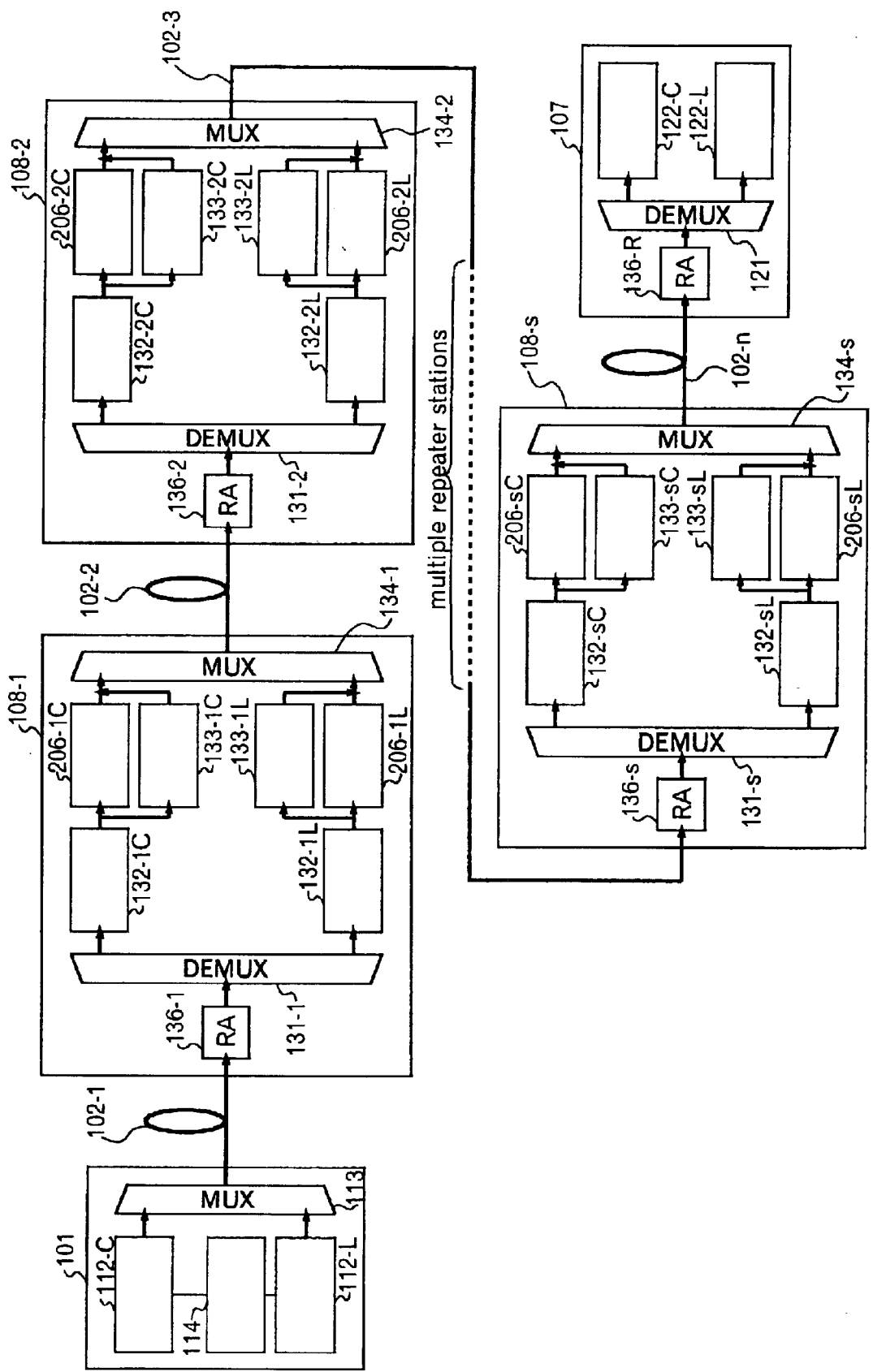
FIG. 10 shows a construction of an optical communication system according to the second embodiment.

FIG. 10 shows a construction of the optical communication system according to the second embodiment.

Referring to FIG. 10, the optical communication system includes an optical transmission station 101, an optical transmission line 102 for transmitting WDM optical signals of two wavelength bands outputted from the optical transmission station 101 and an optical reception station 107 for receiving and processing the WDM optical signals of two wavelength bands so transmitted. The optical communication system may be connected to a plurality of optical repeater stations 108, whenever necessary.

The WDM optical signals of the two wavelength bands are generated by the optical transmission station 101 and are inputted to the optical repeater station 108-1 through the optical transmission line 102-1.

The WDM optical signals of the two wavelength bands inputted to the optical repeater station 108-1 are inputted to DEMUX 131-1 through RA 136-1. The WDM optical signals of the two wavelength bands inputted to DEMUX 131-1 are band-separated into the WDM optical signals of the C-band and the WDM optical signals of the L-band in the same way as in the optical repeater station 104 shown in FIG. 3.

A predetermined signal is added and/or dropped to and from the C-band WDM optical signals of the C-band separated by an OADM part (C-band) 132-1C. The C-band management signal is outputted to a management part (C-band) 133-1C and the rest are amplified by an optical amplification part (C-band) 206-1C on the basis of the information extracted by the management part (C-band) 133-1C. The output of the optical amplification part (C-band) 206-1C is wavelength-division multiplexed with the updated C-band management signal and is then outputted to the MUX 134-1.

Similarly, a predetermined optical signal is added and/or dropped to and from the separated L-band WDM optical signal by an OADM part (L-band) 132-1L. An L-band management signal is outputted to the management part (L-band) 133-1L and the rest are amplified by the optical amplification part (L-band) 206-1L on the basis of the information extracted by the management part (L-band) 133-1L. The output of the optical amplification part (L-band) 206-IL is wavelength-division multiplexed with the updated L-band, management signal and is outputted to the MUX 134-1.

The MUX 134-1 wavelength-division multiplexes the C-band WDM optical signal and the L-band WDM optical signal, regenerates the WDM optical signals of the two wavelength bands and transmits them to the optical transmission line 102-2. Predetermined optical signals are serially added and/or dropped to and from the WDM optical signals of the two wavelength bands, are amplified and are thereafter transmitted to the optical reception station 107.

The WDM optical signals of the two wavelength bands inputted to the optical reception station 107 are inputted to DEMUX 121 through RA 136-R. The WDM optical signals of the two wavelength bands inputted to DEMUX 121 are band-separated into the C-band WDM optical signal and the L-band WDM optical signal in the same way as in the optical reception station 103 shown in FIG. 5.

The C-band WDM optical signal so separated is received and processed by the optical reception part (C-band) 122-C. The L-band WDM optical signal so separated is received and processed by the optical reception part (L-band) 122-L.

Next, the construction of the Raman amplification part 136 will be explained.

Figure 11:
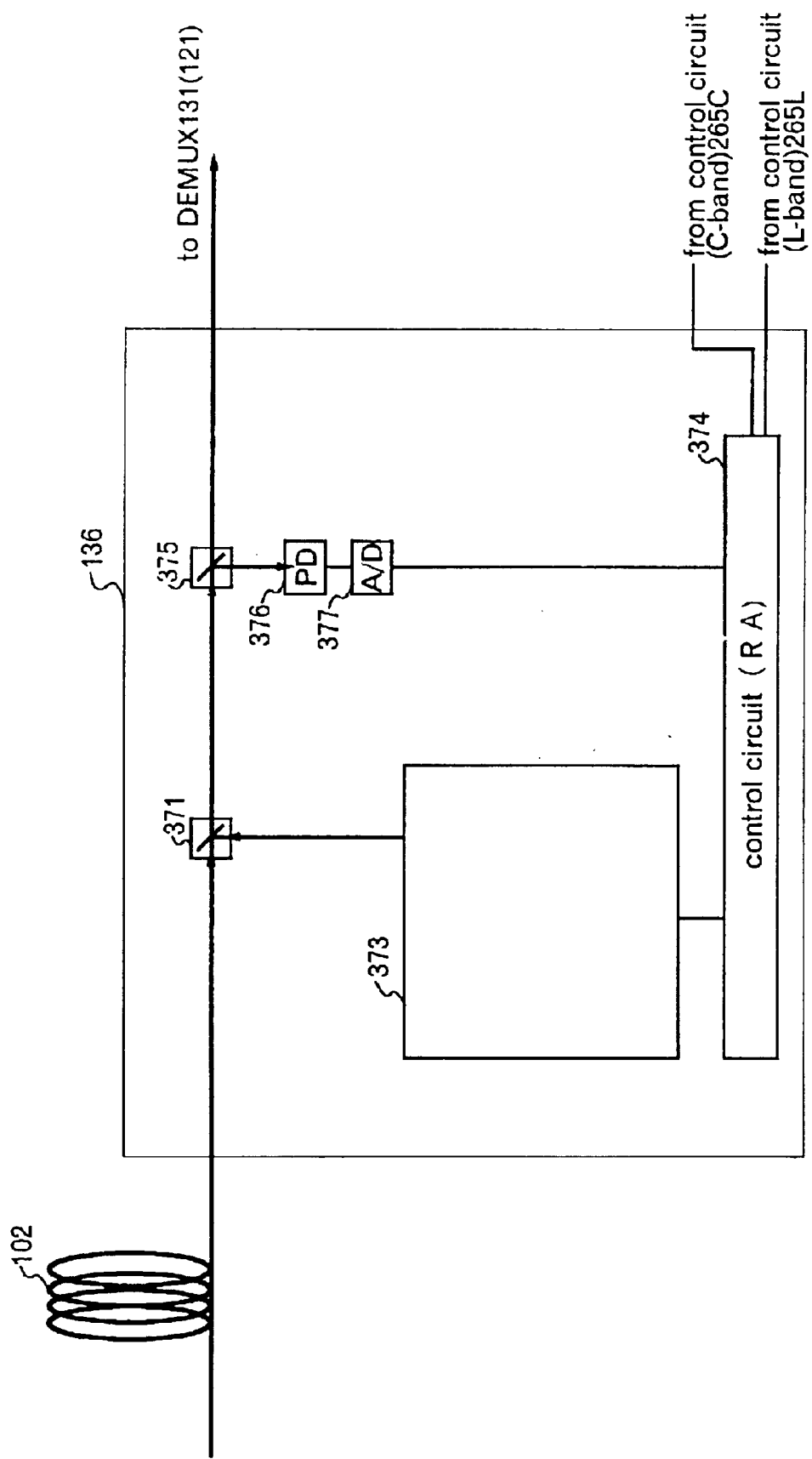
FIG. 11 shows a construction of a Raman amplification part in the optical communication system according to the second embodiment.

FIG. 11 shows the construction of the Raman amplification part in the optical communication system according to the second embodiment.

Referring to FIG. 11, RA 136 includes a pump light source unit 373 and a control circuit (RA) 374. The pump light source unit 373 includes at least one pump light source. The pump light source may be a laser diode, for example.

The control circuit (RA) 374 obtains information of the input level and spectrum information as for the C-band WDM optical signals from the control circuit (C-band) 265C inside the optical amplification part (C-band) 206-C, and obtains the information of the input level and the spectrum information as for the L-band WDM optical signals from the control circuit (L-band) 265-L inside the optical amplification part (L-band) 206-L. The control circuit (RA) 374 adjusts optical power of pump light on the basis of the information so that the gain as a function of wavelength of RA136 attains a predetermined wavelength characteristic.

Pump light is outputted to the optical repeater station 108 of the preceding stage (or to the optical transmission station 101) and to the optical transmission line 102 extending to the optical repeater station 108 through CPL 371 connected to the optical transmission line 102.

The optical transmission line 102 Raman-amplifies the WDM optical signals of the two wavelength bands by this lump light.

CPL 375 distributes a part of the WDM optical signals of the two wavelength bands inputted from the optical transmission line 102. After photoelectric conversion, PDL 376 outputs its output to the control circuit (RA) 374 through the A/D converter 377.

Raman amplification is the phenomenon in which pump light interacts with phonons in the optical transmission line 102, shifts optical power of pump light to the rays of light on the longer wavelength side than the wavelength of pump light and amplifies the rays of light. The Raman gain coefficient of the optical fiber is generally subjected to triangular approximation, and FIG. 12 shows its typical example.

Figure 12:
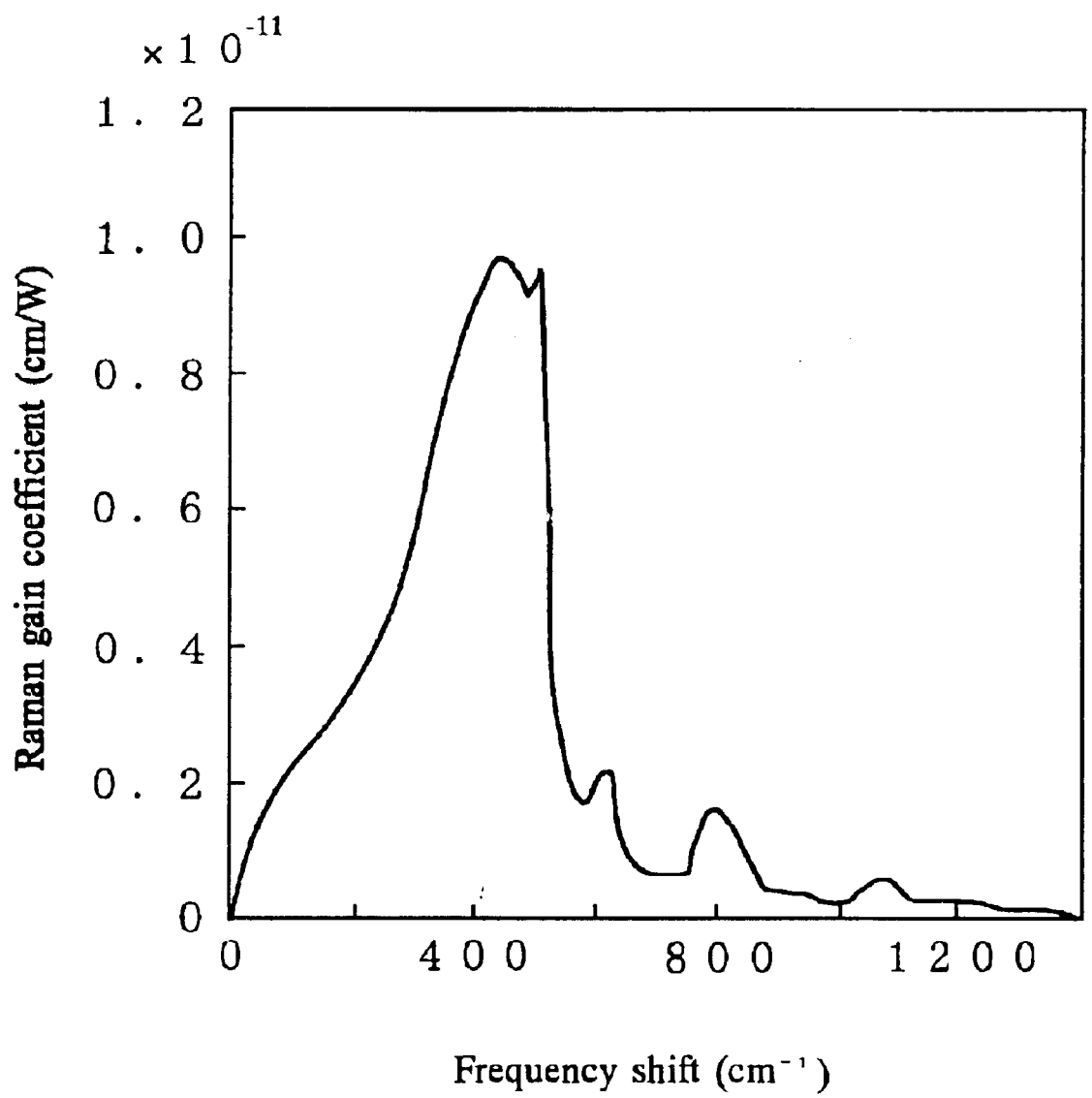
FIG. 12 shows a Raman gain coefficient of an optical fiber.

FIG. 12 is an excerpt diagram from R. G. Stolen: "Non-linearity in fiber transmission", Proc. IEEE, Vol. 68, p1232–1236, 1980. The ordinate of FIG. 12 represents a Raman gain coefficient in cm/W unit and the abscissa does a frequency shift in cm$^{-1}$ unit. The curve of FIG. 12 represents the Raman gain coefficient when the wavelength of pump light is 1 μm, but the profile of the curve does not much change depending on the pump wavelength. As shown in FIG. 12, the Raman gain coefficient starts occurring at a frequency shifted by about 200 (cm$^{-1}$) from the frequency of one pump light, reaches the maximum at the frequency shifted by about 430 (cm$^{-1}$), then assumes the minimum value, reaches the maximum again at the frequency shifted by about 480 (cm$^{-1}$), drops thereafter drastically, and extinguishes after repeating these maximum and minimum values. Needless to say, the Raman gain also exhibits a change similar to that of the Raman gain coefficient.

Pump light and its optical power are decided upon consideration of the curve of the Raman gain coefficient shown in FIG. 12 so that the gain as a function of wavelength has predetermined wavelength characteristics.

[Operation and Effect of Second Embodiment]

Next, the explanation will be given on the activation method of the optical communication system of the second embodiment when the optical system is installed afresh or when any change occurs in the optical communication system such as the addition of the optical repeater station 108.

The second embodiment includes the Raman amplification part 136 for amplifying the WDM optical signals of the two wavelength bands by utilizing the induced Raman scattering phenomenon. Therefore, the system management part 114 activates the optical communication system in the following way.

Figure 13:
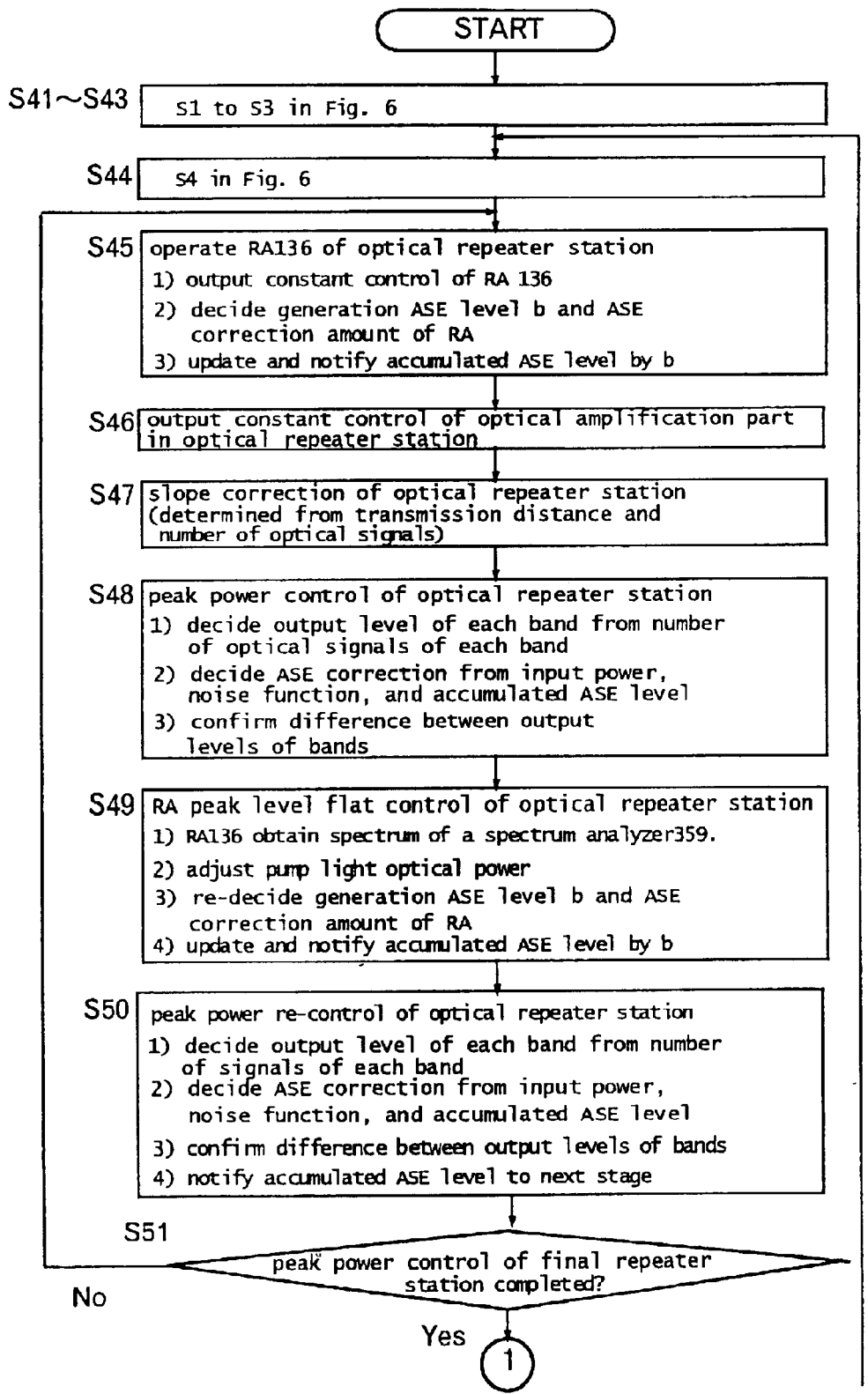
FIG. 13 is a flowchart (No. 1) of activating the optical communication system according to the second embodiment.

FIG. 13 is a flowchart (No. 1) of activating the optical communication system according to the second embodiment.

Figure 14:
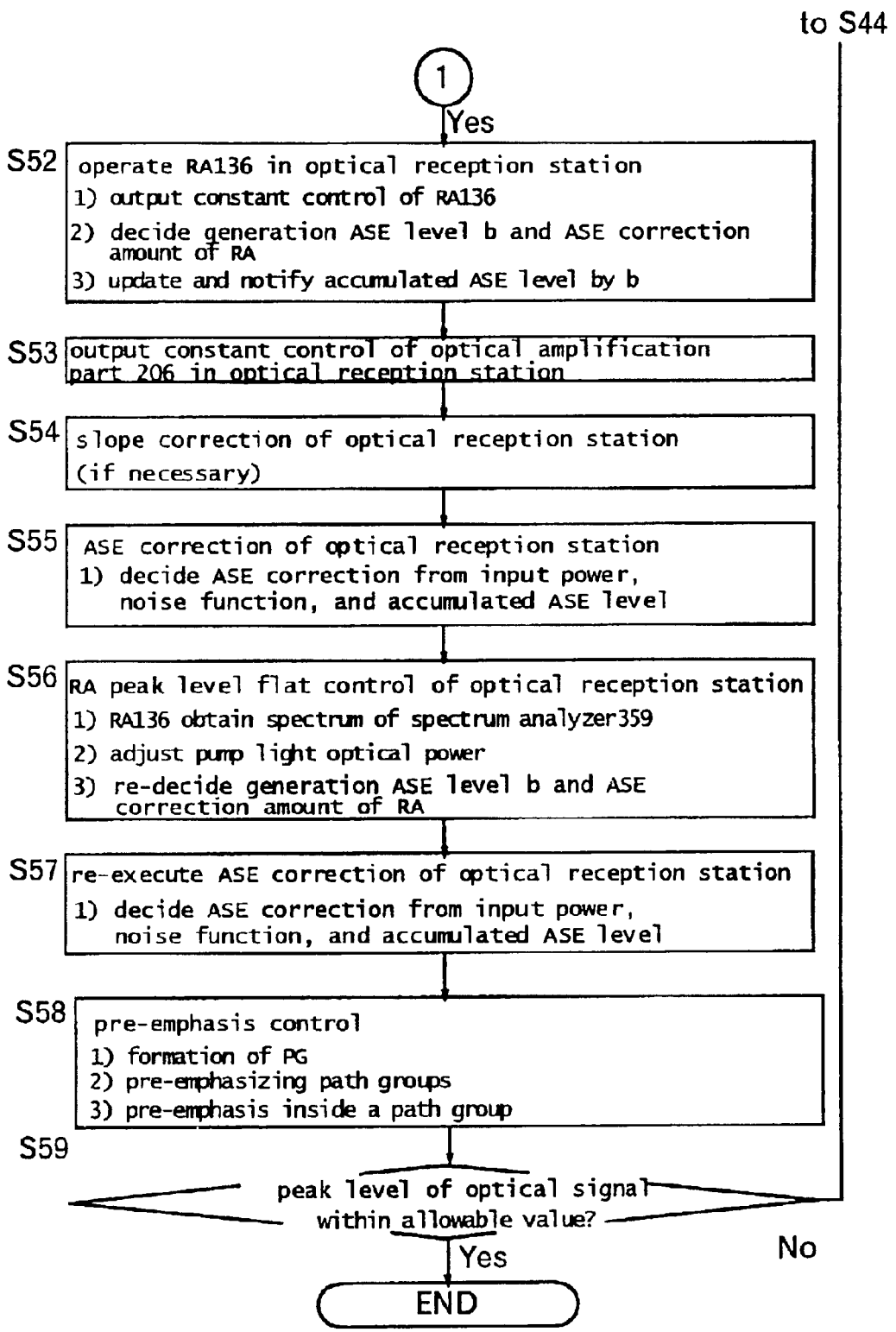
FIG. 14 is a flowchart (No. 2) of activating the optical communication system according to the second embodiment.

FIG. 14 is a flowchart (No. 2) of activating the optical communication system according to the second embodiment.

The operator instructs the system management part 114 to activate the optical communication system.

Referring to FIGS. 13 and 14, the operations conducted by the system management part 114 for the optical transmission station 101, that is, the operation of laser diodes 201-1C to 201-aC, 201-1L to 201-bL (S41), equalization of optical power of each optical signal (channels 1 to 64) in the WDM optical signals of the two wavelength bands, output constant control of the optical amplification part 206C (S42), slope compensation (S43) and peak power control (S44), are the same as S1 to S4 of the first embodiment. Therefore, the explanation of such operations will be omitted.

The control circuit (C-band) 265-0C and the control circuit (L-band) 265-0L inside the optical transmission station 101 notify the system management part 114 of the completion of slope compensation and peak power control.

Receiving this notice, the system management part 114 judges the completion of slope compensation and peak power control for the first span between the optical transmission station 101 and the optical relay station 108-1.

The system management part 114 operates RA 136-1 through the control circuit (C-band) 265-1C and the control circuit (L-band) 265-1L so as to conduct Raman amplification in the optical transmission line 102-1. The control circuit (RA) 374-1 controls the output of the pump light source so that the level of pump light reaches a predetermined level.

Raman amplification invites ASE similarly to OFA 252C. Therefore, the control circuit (RA) 374-1 calculates the ASE correction amount and the ASE level bk occurring due to Raman amplification by various formulas similar to equations 6 to 10, and conducts correction.

The control circuit (RA) 374-1 adds the ASE level bk resulting from Raman amplification to the accumulated ASE level dk-1 extracted from the management signal, and updates the accumulated ASE level dk-1. The control circuit (RA) 374-1 stores the updated accumulated ASE level dk-1 in the memory and notifies the control circuit (C-band) 265-1C and the control circuit (L-band) 265-1L of the result of updating (S45).

The control circuit (C-band) 265-1C and the control circuit (L-band) 265-1L inside the optical repeater station 108-1 notify the system management part 114 of the completion of activation of RA 136 and updating of the accumulated ASE level dk-1.

Receiving this notice, the system management part 114 judges the completion of activation of RA 136-1 in the first span. The system management part 114 instructs the optical repeater station 108-1 though the management signal to execute slope compensation and peak power control for the second span.

Receiving this notice, the control circuit (C-band) 206-1C and the control circuit (L-band) 206-1L inside the optical repeater station 104-1 switch OFA 252 and OFA 254 to output constant control (S46) and execute slope compensation (S47) and peak power control (S48) in the same way as in the first embodiment. The control circuit (C-band) 206-1C and the control circuit (L-band) 206-1L inside the optical repeater station 108-1 notify the system management part 114 of the completion of slope compensation and peak power control through the management signal.

Receiving this notice, the system management part 114 judges the completion of slope compensation and peak power control in the optical repeater station 108-1. The system management part 114 executes RA peak level flat control for RA 136-1 so as to have substantially equal level in each optical signal in the C-band WDM optical signal and the L-band WDM optical signal (S49).

More concretely, the control circuit (RA) 374-1 obtains the spectrum (the spectrum in the C-band WDM optical signal) detected by the spectrum analyzer 259C, through the control circuit (C-band) 265-1C. The control circuit (RA) 374-1 obtains the spectrum (the spectrum in the L-band WDM optical signal) detected by a spectrum analyzer 259L, through the control circuit (L-band) 265-1.

The control circuit (RA) 374-1 refers to the spectrum of each band and adjusts each output of the pump light source so that a difference among the levels in all the optical signals falls within a predetermined allowance value.

Consequently, since optical power of pump light outputted from CPL 372 is changed, the control circuit (RA) 374-1 recalculates the ASE level bk resulting from Raman amplification and the accumulated ASE level dk-1, stores the calculation result in the memory and notifies the control circuit (C-band) 265-1C and the control circuit (L-band) 265-1L of the calculation result.

Receiving the notice, the control circuit (C-band) 265-1C and the control circuit (L-band) 265-1L recalculate the ASE correction amount on the basis of the accumulated ASE level dk-1 recalculated, and re-execute peak power control (S50).

The control station (C-band) 265-1C and the control circuit (L-band) 265-1L inside the optical repeater station 108-1 notify the system management part 114 of the completion of peak power control.

Receiving this notice, the system management part 114 judges the completion of the activation processing for the optical repeater station 108-1. The system management part 114 instructs the optical repeater station 108-2 through the management signal to activate RA 136-2, the optical amplification part (C-band) 206-2C and the optical amplification part (L-band) 206-2L for the optical repeater station 108-1.

The optical repeater station 108-2, as the optical repeater station 108-, recalculates the ASE level bk and the ASE correction amount generated due to Raman amplification in the control circuit (RA) 374-2 (S45). The control circuit (C-band) 265-2C and the control circuit (L-band) 265-2L switch output constant control of OFA (S46) and execute slope compensation (S47) and peak power control (S48). The control circuit (RA) 374-2 executes RA peak level flat control (S49), and the control circuit (C-band) 265-2C and the control circuit (L-band) 265-2L execute peak power re-control (S50). The control circuit (C-band) 265-2C and the control circuit (L-band) 265-2L in the optical repeater station 108-2 notify the system management part 114 of the completion of peak power control.

Receiving this notice, the system management part 114 judges the completion of the activation processing in the optical repeater station 108-2. The system management part 114 instructs the optical repeater station 108-3 through the management signal to activate RA 136-3, the optical amplification part (C-band) 206-3C and the optical amplification part (L-band) 206-3L for the optical repeater station 104-3.

Thereafter, RA 136 and the optical amplification part 206 is serially activated in the same way from the first optical repeater station 108-1 to the last optical repeater station 108-s for each of the stations 108 and 107 (S51).

Finally, the control circuits 265C and 265L in the optical reception station 107 activate RA 136-R and the optical amplification part 206 (S52 to S57) in the same way as the optical repeater stations described above (S45 to S50). In this instance, the optical amplification part 206 executes only ASE correction of peak power control (S55, S57).

The system management part 114 receives the management signal containing information representing the completion of slope compensation and peak power control in the last span, and then pre-emphasizes each optical signal in the WDM optical signals of the two wavelength bands (S58).

Since the pre-emphasis is the same as that of the first embodiment, its explanation will be omitted.

After the completion of pre-emphasis, the system management part 114 stores the pre-emphasis amount of each optical signal in the memory and notifies each RA 136 of the pre-emphasis amount through the management signal. Each control circuit (RA) 374 stores the pre-emphasis amount of each optical signal in the memory.

The system management part 114 measures the peak level in each optical signal. A photo diode 258 for monitoring the output power of the optical amplification part 206 measures the total output of the optical amplification part. The ASE correction amount is subtracted from this value. The balance is subjected to the division calculation by the total number of channels. The output mean level is thus calculated. Variance from the mean of each optical signal measured by the spectrum analyzer 259 is added to the output mean level. The peak level in each optical signal is thus calculated. When the peak level in each optical signal exceeds the allowable value in this case, necessary controls are re-executed in sequence starting from peak power control in the optical transmission station 101. When it is within the allowable range, the activation processing is completed, and the optical communication system starts its operation (S59).

In the second embodiment, the optical communication system is activated as described above, it is possible to optimize the pump light level of Raman amplification, slope compensation, peak power control, and pre-emphasis. Therefore, the optical communication system according to the second embodiment can equalize the optical SNR in each optical signal in the WDM optical signals of the two wavelength bands, which enables long distance transmission.

Next, the explanation will be given on the case where the number of multiplexing in the WDM optical signals of the two wavelength bands is increased or decreased in the optical communication system according to the second embodiment.

Figure 15:
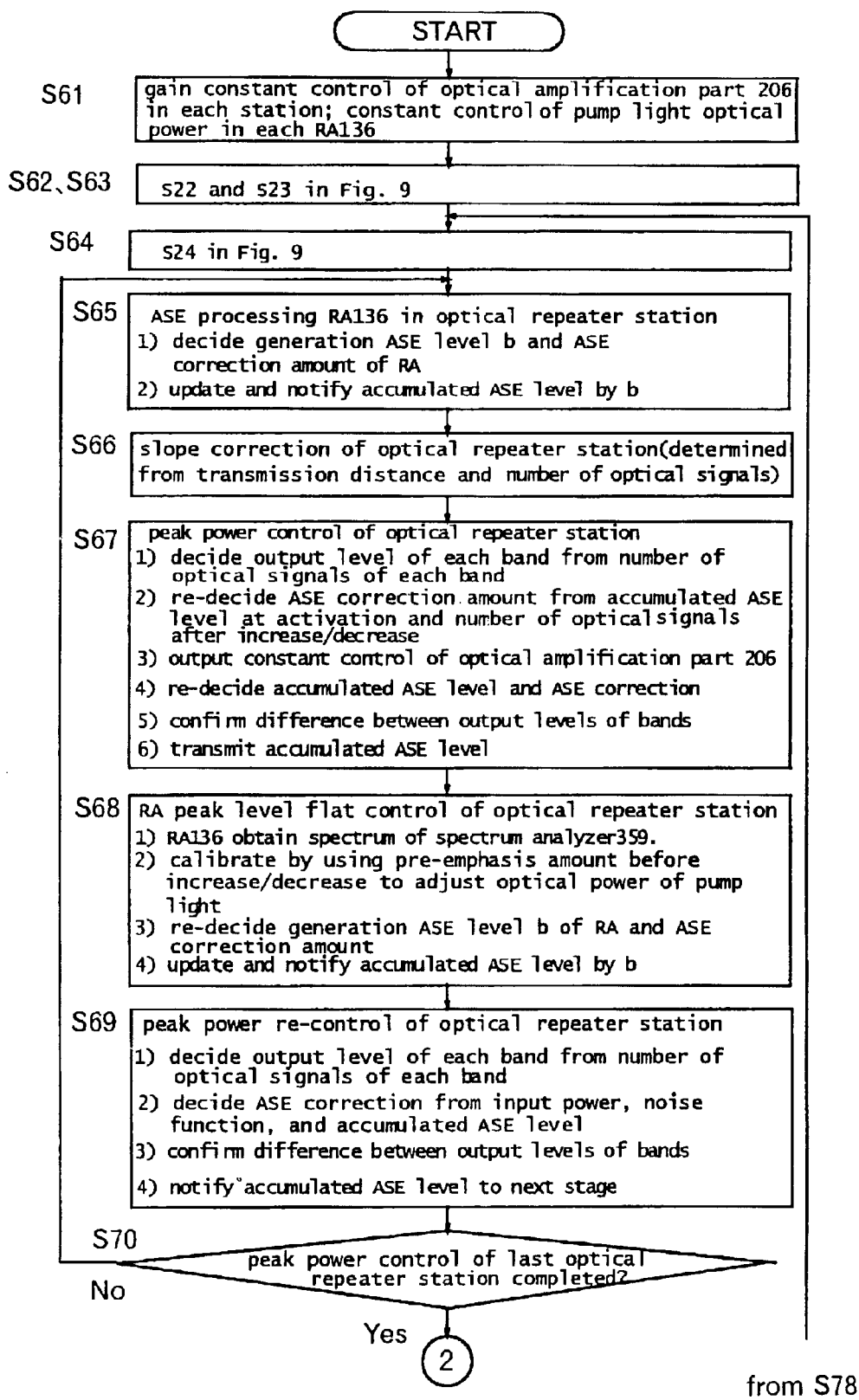
FIG. 15 is a flowchart (No. 1) of increasing or decreasing channels in the optical communication system according to the second embodiment.

FIG. 15 is a flowchart (No. 1) when the channels are increased or decreased in the optical communication system according to the second embodiment.

Figure 16:
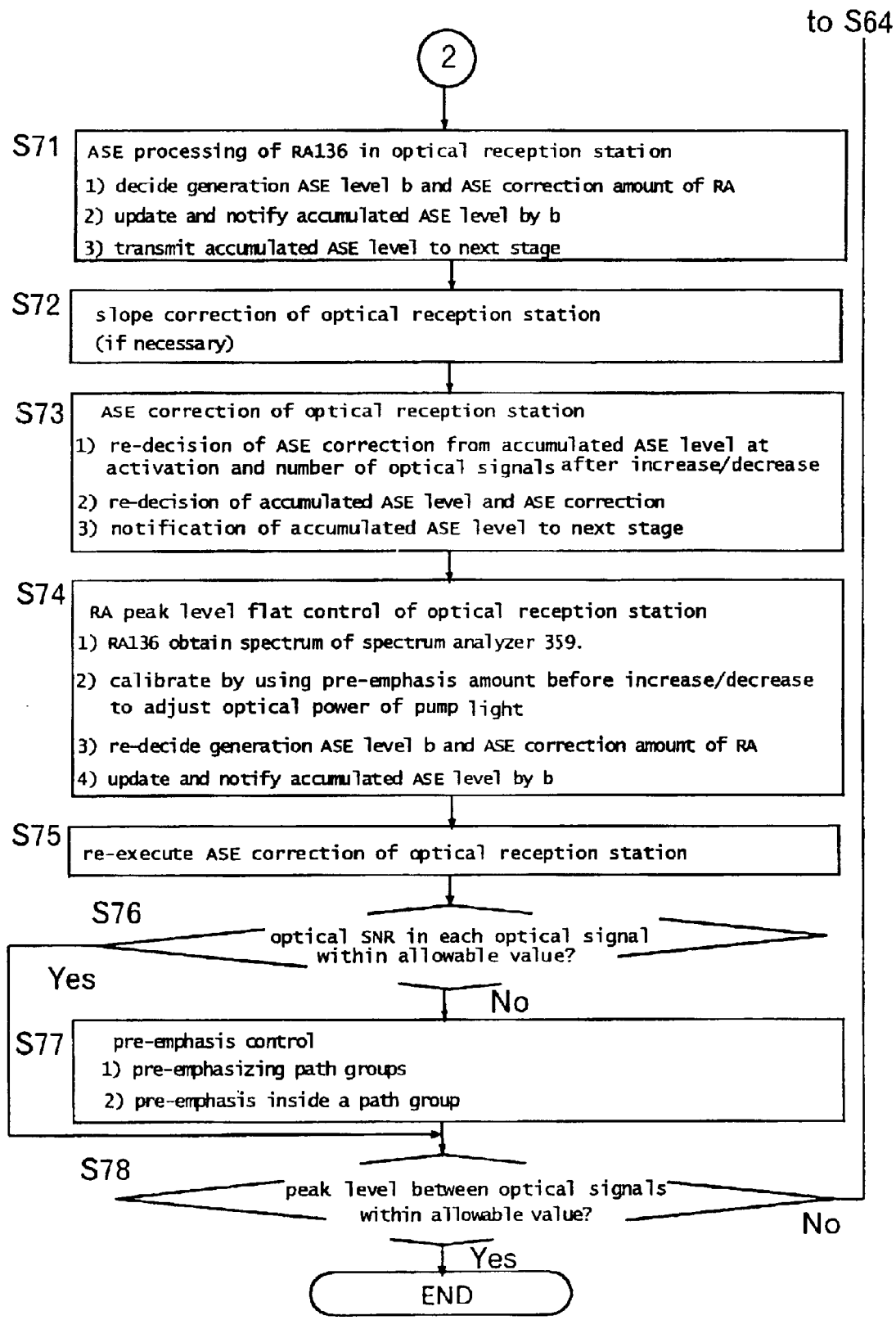
FIG. 16 is a flowchart (No. 2) of increasing or decreasing channels in the optical communication system according to the second embodiment.

FIG. 16 is a flowchart (No. 2) when the channels are increased or decreased in the optical communication system according to the second embodiment.

The operator increases (or decreases) the channels by adding (or reducing) a channel unit comprising a laser diode 201, optical modulator 202 and VAT 203 to (or from) the MUX 204.

The operator instructs the system management part 114 to increase (or decrease) the channels of the optical communication system.

Referring to FIGS. 15 and 16, the system management part 114 instructs all the control circuits (C-band) 265C and control circuits (L-band) 265L to operate all the optical amplification parts (C-band) 206C and optical amplification parts (L-band) 206L inside the optical transmission station 101, the optical repeater station 108 and the optical reception station 107 at a predetermined constant gain. The system management part 114 instructs all the control circuits (RA) 374 to operate all RA 136 inside the optical repeater station 108 and the optical reception station 107 at predetermined constant pump light power (S61). Incidentally, the system management part 114 gives instruction to the optical repeater station 104 and the optical reception station 103 through the management signal. The predetermined constant gain is, for example, a value at which the gain as a function of wavelength of the optical amplification part 206 is substantially flat. Predetermined constant pump light power is a value at which optical power before the increase (decrease) of the channel can be maintained.

The system management part 114 increases (or decreases) the channel by operating the channel unit.

After the channel is thus increased (or decreased), the system management part 114 updates the management signal by the new number of multiplexing, and stores the instruction to execute slope compensation and peak power control in the management signal.

The system management part 114 executes slope compensation and peak power control for the optical transmission station 101 (S62 to S64) in the same way as the channel increase (decrease) in S22 to S24 in the first embodiment.

The system management part 114 executes the following controls for the optical repeater station 108-1. Namely, the control circuit (RA) 374-2 calculates the ASE level $b_k$ and the ASE correction amount resulting from Raman amplification (S65). The control circuit (C-band) 265-2C and the control circuit (L-band) 265-2L execute slope compensation (S66) and peak power control (S67). The control circuit (RA) 374-2 executes RA peak level flat control (S68). The control circuit (C-band) 265-2C and the control circuit (L-band) 265-2L re-execute peak power control (S69).

RA peak level flat control is executed with reference to the spectrum of each band as described above. In the case of increasing (decreasing) the channel, the spectrum of the C-band WDM optical signals is obtained by subtracting the pre-emphasis amount of each optical signal stored in the memory from the spectrum detected by the spectrum analyzer 259c. The spectrum of the L-band WDM optical signal is obtained by subtracting the pre-emphasis amount of each optical signal stored in the memory from the spectrum detected by the spectrum analyzer 259L. Unless the outputs of the spectrum analyzers 259C and 259L are calibrated according to the respective pre-emphasis amount of each optical signal, the pre-emphasis amount is supplemented under the RA peak level flat control, and the pre-emphasis effect made in the optical transmission station 101 does not affect the optical reception station 107.

The processing S65 to S69 is the same as S45 and S47 to S50 for activating the optical communication system according to the second embodiment with the exception of the calibration processing, and its explanation will be omitted.

After the processing for the optical repeater station 108-1 is completed, the system management part 114 operates RA 136 calculate the ASE level bk and the ASE correction amount resulting from Raman amplification (S65) and re-execute slope compensation (S66), peak power control (S67), RA peak level flat control (S68) and peak power control (S69, S70). The above operation is performed in sequence through the last optical repeater station 108-s.

Finally, the optical reception station 107 the same as in the optical repeater station 108 (S65 to S69) operates RA 136-R to calculate the ASE level $b_k$ and the ASE correction amount resulting from Raman amplification (S71), execute slope compensation (S72), peak power control (S73), and RA peak flat control (S74), and re-execute peak power control (S75). However, only ASE correction is executed in the peak power control (S73, S75).

Next, the system management part 114 pre-emphasizes each optical signal in the WDM optical signals of the two wavelength bands.

The system management part 114 receives the spectrum of each WDM optical signal of the two wavelength bands from the optical transmissions station 103, and judges the optical SNR in each optical signal from this spectrum (S76). When the difference of the optical SNRs in the optical signals is within the predetermined allowable value, the system management part 114 does not pre-emphasize again. When the difference exceeds the predetermined allowable value, the system management part 114 re-executes pre-emphasis in the same way as the activation processing of the optical communication system (S77).

When the system management part 114 re-executes pre-emphasis, it stores the pre-emphasis amount of each optical signal in the memory after the completion of pre-emphasis, and notifies each RA 136 of the pre-emphasis amount through the management signal. Each control circuit (RA) 374 stores the pre-emphasis amount of each optical signal in the memory.

The system management part 114 calculates the optical signal peak level and judges whether or not the peak level is within the allowable value, in the same way as the activation processing. When the peak level exceeds the allowable value, the system management part 114 serially re-executes controls from the peak power control of the optical transmission station 101. When it is within the allowable value, the system management part 114 completes the increasing (decreasing) processing of the channel and starts the operation of the optical communication system (S78).

Since the second optical communication system conducts Raman amplification and pre-emphasis in the procedures described above, it is possible to prevent the pre-emphasis amount from being offset by Raman amplification. Therefore, the second optical communication system can reliably transmit pre-emphasis made in the optical station 101 and the inserting optical signal transmission circuit 305 in the optical transmission station 101 and the optical repeater station 108 to the branching optical signal reception circuit 304 in the optical reception station 107 and the optical repeater station 108. The second optical communication system can substantially equalize the optical SNRs of the optical signals one another, which enables further extension of the transmission distance.

In the first and second embodiments, it may be possible to store a program where the procedures described above are recorded, in a computer-readable recording medium such as a floppy disk or a magneto-optical disk, and to supply the program from outside to the system management part 114.

The optical communication system according to the second embodiment comprises the optical repeater stations 108 equipped with RA 136 for all the optical repeater stations. However, the present invention can be likewise applied to an optical communication system comprising both the optical repeater stations (not equipped with RA 136) and the optical repeater stations 108.

Though there has been described the construction in which the optical repeater station 104 comprises the spectrum analyzer 259, all the optical repeater stations 104 need not always comprise a spectrum analyzer in the optical communication system. In this case, the spectrum of the optical repeater station not comprising a spectrum analyzer may be calculated by acquiring the information of the spectrum from the preceding or subsequent optical repeater station with a spectrum analyzer to perform weighting by the transmission distance.

In the first and second embodiments, the WDM optical signals of the two wavelength bands are thirty-two optical signals arranged in each of the C-and L-bands, but the number of the optical signals is not particularly imitative. The WDM optical signals may be optical signals of an arbitrary number of wavelengths (number of multiplexing) arranged in an arbitrary band. Furthermore, the number of bands of the WDM optical signals is not particularly limited to two, and the present invention can be applied to an arbitrary number of bands.

The wavelength bands may be an S+band (1,450 to 1,490 nm), an S band (1,490 to 1,530 nm) and an L+band (1,610 to 1,650 nm) in accordance with a wavelength band where optical signals are transmitted.

The invention is not limited to the above embodiments and various modifications may be made without departing from the spirit and the scope of the invention. Any improvement may be made in part or all of the components.

What is claimed is:

1. A method of activating an optical communication system comprising a plurality of optical repeater stations each having an optical amplifier for amplifying light, said optical repeater stations being between optical transmission lines wherein wavelength-division multiplex optical signals are transmitted, comprising:

a first step of generating a desired slope in a desired wavelength range of a gain wavelength curve of said optical amplifier;

a second step of adjusting an output of said optical amplifier to a desired output level;

a third step of performing said first and second steps in said plurality of optical repeater stations, said steps being carried out in sequence from the first to the last optical repeater stations; and a fourth step of adjusting level in each optical signal in said wavelength-division multiplex optical signal so as to have substantially constant optical signal-to-noise ratios in the optical signals to be received.

2. A method of activating an optical communication system according to claim 1, wherein said second step further includes a step of subtracting a level of amplified spontaneous emission in said optical amplifier from a desired output level.

3. A method of activating an optical communication system comprising a plurality of optical repeater stations each having an optical amplifier for amplifying light, said optical repeater stations being between optical transmission lines wherein wavelength-division multiplex optical signals are transmitted, comprising:

a first step of generating a desired slope in a desired wavelength range of a gain wavelength curve of said optical amplifier;

a second step of adjusting an output of said optical amplifier to a desired output level;

a third step of performing said first and second steps in said plurality of optical repeater stations, said steps being carried out in sequence from the first to the last optical repeater stations; and a fourth step of adjusting level in each optical signal in said wavelength-division multiplex optical signal so as to have substantially constant optical signal-to-noise ratios in the optical signals to be received, wherein said fourth step comprises:

a first step of creating a plurality of path groups by collecting said optical signals which is input to/output from same positions in said optical transmission lines, to be one;

a second step of pre-emphasizing said plurality of path groups, each of which is considered a single optical signal; and a third step of pre-emphasizing said optical signals in each of said path groups.

4. A method of activating an optical communication system according to claim 1, wherein said optical signals in said wavelength-division multiplex optical signal are arranged in a plurality of wavelength bands.

5. A method of increasing or decreasing the number of channels in an optical communication system comprising a plurality of optical repeater stations each having an optical amplifier for amplifying light, said optical repeater stations being between optical transmission lines wherein wavelength-division multiplex optical signals are transmitted, comprising:

a first step of wavelength-division multiplexing an optical signal corresponding to a channel to be increased or decreased;

a second step of generating a desired slope in a desired wavelength range of a gain wavelength curve of said optical amplifier; and a third step of adjusting an output of said optical amplifier to a desired output level;

a fourth step of performing said first and second steps in said plurality of optical repeater stations, said steps being carried out in sequence from the first to the last optical repeater stations.

6. A method of increasing or decreasing the number of channels according to claim 5, further comprising a step of adjusting level in each optical signal in said wavelength-division multiplex optical signal so as to have substantially constant optical signal-to-noise ratios in the optical signals to be received.

7. A method of increasing or decreasing the number of channels according to claim 5, wherein said optical signals in said wavelength-division multiplex optical signal are arranged in a plurality of wavelength bands.

8. A method of activating an optical communication system comprising a plurality of optical repeater stations each having a Raman amplifier for supplying pump light to Raman-amplify light to be inputted and an optical amplifier for amplifying light to be outputted, said optical repeater stations being between optical transmission lines wherein wavelength-division multiplex signals are transmitted, comprising:

a first step of supplying pump light of said Raman amplifier at a desired level;

a second step of generating a desired slope in a desired wavelength range of a gain wavelength curve of said optical amplifier;

a third step of adjusting said pump light of said Raman amplifier so that levels in said optical signals in said wavelength-division multiplex optical signal become substantially equal to one another in said optical repeater stations;

a fourth step of adjusting an output of said optical amplifier to a level which is obtained by subtracting a sum of a level of amplified spontaneous emission generated by said adjusted pump light and a level of amplified spontaneous emission occurring in said optical amplifier from said desired output level;

a fifth step of performing said first to fourth steps in said plurality of said optical repeater stations, said steps being carried out in sequence from the first to last optical repeater stations; and a sixth step of adjusting level in each optical signal in said wavelength-division multiplex optical signal so as to have substantially constant optical signal-to-noise ratios in the optical signals to be received.

9. A method of activating an optical communication system according to claim 8, wherein said optical signals in said wavelength-division multiplex optical signal are arranged in a plurality of wavelength bands.

10. A method of increasing or decreasing the number of channels in an optical communication system comprising a plurality of optical repeater stations each having a Raman amplifier for supplying pump light to Raman-amplify light to be inputted and an optical amplifier for amplifying light to be outputted, said optical repeater stations being between optical transmission lines wherein wavelength-division multiplex signals are transmitted, comprising:

a first step of wavelength-division multiplexing an optical signal corresponding to a channel to be increased or decreased;

a second step of generating a desired slope in a desired wavelength range of a gain wavelength curve of said optical amplifier;

a third step of adjusting said pump light of said Raman amplifier so that levels, in said optical signals in said wavelength-division multiplex optical signal, which are obtained by subtracting a pre-emphasis amount given to said each optical signal before the channel increase/decrease, become substantially equal to one another in said optical repeater stations;

a fourth step of adjusting an output of said optical amplifier to a level which is obtained by subtracting a sum of a level of amplified spontaneous emission generated by said adjusted pump light and a level of amplified spontaneous emission occurring in said optical amplifier from said desired output level; and a fifth step of performing said first to fourth steps in said plurality of said optical repeater stations, said steps being carded out in sequence from the first to last optical repeater stations.

11. A method of increasing or decreasing the number of channels according to claim 10, further comprising a step of adjusting level in each optical signal in said wavelength-division multiplex optical signal so as to have substantially constant optical signal-to-noise ratios in the optical signals to be received.

12. A method of increasing or decreasing the number of channels according to claim 10, wherein said optical signals in said wavelength-division multiplex signals are arranged in a plurality of wavelength bands.

13. A computer-readable recording medium wherein a program to be executed by a computer is recorded, said program used for activating an optical communication system comprising a plurality of optical stations each having an optical amplifier for amplifying light, said optical repeater stations being between optical transmission lines wherein wavelength-division multiplex optical signals are transmitted, comprising:

a first step of generating a desired slope in a desired wavelength range of a gain wavelength curve of said optical amplifier;

a second step of adjusting an output of said optical amplifier to a desired output level;

a third step of performing said first and second steps in said plurality of optical repeater stations, said steps being carried out in sequence from the first to the last repeater station; and a fourth step of adjusting level in each optical signal in said wavelength-division multiplex optical signal so as to have substantially constant optical signal-to-noise ratios in the optical signals to be received.

14. A method of activating an optical communication system comprising a plurality of optical repeater stations each having a corresponding optical amplifier for amplifying light, said optical repeater stations being between optical transmission lines wherein wavelength-division multiplex optical signals are transmitted, comprising:

generating, for each of the optical repeater stations, a desired slope in a desired wavelength range of a gain wavelength curve of the corresponding optical amplifier, first adjusting, for each of the optical repeater stations, an output of the corresponding optical amplifier to a desired output level; and second adjusting a level in each of said wavelength-division multiplex optical signals so as to have substantially constant optical signal-to-noise ratios in the wavelength-division multiplex optical signals, wherein said generating and first adjusting for each of the optical repeater stations are carried out in sequence from a first to a last one of the optical repeater stations.

15. A method of activating an optical communication system according to claim 14, wherein said first adjusting further includes subtracting a level of amplified spontaneous emission in the corresponding optical amplifier from a desired output level.

16. A method of activating an optical communication system comprising a plurality of optical repeater stations each having a corresponding optical amplifier for amplifying light, said optical repeater stations being between optical transmission lines wherein wavelength-division multiplex optical signals are transmitted, comprising:

generating, for each of the optical repeater stations, a desired slope in a desired wavelength range of a gain wavelength curve of the corresponding optical amplifier, first adjusting, for each of the optical repeater stations, an output of the corresponding optical amplifier to a desired output level; and second adjusting a level in each of said wavelength-division multiplex optical signals so as to have substantially constant optical signal-to-noise ratios in the optical signals, wherein said generating and first adjusting for each of the optical repeater stations are carried out in sequence from a first to a last one of the optical repeater stations, and wherein said second adjusting includes:

creating a plurality of path groups by collecting said wavelength-division multiplex optical signals which are input to or output from same positions in said optical transmission lines, to be a single wavelength-division multiplex optical signal;

first pre-emphasizing said path groups, each of the path groups being considered a single wavelength-division multiplex optical signal; and second pre-emphasizing said wavelength-division multiplex optical signals in each of said path groups.

17. A method of activating an optical communication system according to claim 14, wherein said wavelength-division multiplex optical signals are arranged in a plurality of wavelength bands.

18. A method of increasing or decreasing the number of channels in an optical communication system comprising a plurality of optical repeater stations each having a corresponding optical amplifier for amplifying light, said optical repeater stations being between optical transmission lines wherein wavelength-division multiplex optical signals are transmitted, comprising, for each optical repeater station:

performing wavelength-division multiplexing of an optical signal corresponding to a channel to be increased or decreased;

generating a desired slope in a desired wavelength range of a gain wavelength curve of the corresponding optical amplifier; and adjusting an output of the corresponding optical amplifier to a desired output level, wherein said performing wavelength-division multiplexing and generating a desired slope are carried out in sequence from a first to the last one of the optical repeater stations.

19. A method of increasing or decreasing the number of channels according to claim 18, further comprising adjusting a level in each of said wavelength-division multiplex optical signals so as to have substantially constant optical signal-to-noise ratios in the wavelength-division multiplex optical signals.

20. A method of increasing or decreasing the number of channels according to claim 18, wherein said wavelength-division multiplex optical signals are arranged in a plurality of wavelength bands.

21. A method of activating an optical communication system comprising a plurality of optical repeater stations each having a corresponding Raman amplifier for supplying pump light to Raman-amplify incoming light and an optical amplifier for amplifying outgoing light, said optical repeater stations being between optical transmission lines wherein wavelength-division multiplex signals are transmitted, comprising, for each of the optical repeater stations:

supplying pump light of the corresponding Raman amplifier at a desired level;

generating a desired slope in a desired wavelength range of a gain wavelength curve of the corresponding optical amplifier;

first adjusting said pump light of the corresponding Raman amplifier so that levels in said wavelength-division multiplex optical signals become substantially equal to one another in said optical repeater stations;

second adjusting an output of the corresponding optical amplifier to a level which is obtained by subtracting a sum of a level of amplified spontaneous emission generated by said adjusted pump light and a level of amplified spontaneous emission occurring in the corresponding optical amplifier from said desired output level; and third adjusting a level in said wavelength-division multiplex optical signals so as to have substantially constant optical signal-to-noise ratios in the wavelength-division multiplex optical signals, wherein said supplying, generating, and first and second adjusting are carried out in sequence from a first to a last one of the optical repeater stations.

22. A method of activating an optical communication system according to claim 21, wherein said wavelength-division multiplex optical signals are arranged in a plurality of wavelength bands.

23. A method of increasing or decreasing the number of channels in an optical communication system comprising a plurality of optical repeater stations each having a corresponding Raman amplifier for supplying pump light to Raman-amplify incoming light and an optical amplifier for amplifying outgoing light, said optical repeater stations being between optical transmission lines wherein wavelength-division multiplex optical signals are transmitted, comprising, for each of the optical repeater stations:

performing wavelength-division multiplexing of an optical signal corresponding to a channel to be increased or decreased;

generating a desired slope in a desired wavelength range of a gain wavelength curve of the corresponding optical amplifier;

first adjusting pump light of the corresponding Raman amplifier so that levels in said wavelength-division multiplex optical signals become substantially equal to one another in each of said optical repeater stations, said levels being obtained by subtracting a pre-emphasis amount given to said wavelength-division multiplex optical signals before a channel increase or decrease; and second adjusting an output of the corresponding optical amplifier to a level which is obtained by subtracting a sum of a level of amplified spontaneous emission generated by said adjusted pump light and a level of amplified spontaneous emission occurring in the corresponding optical amplifier from said desired output level, wherein said performing wavelength-division multiplexing, generating a desired slope and first and second adjusting are carried out in sequence from a first to a last one of the optical repeater stations.

24. A method of increasing or decreasing the number of channels according to claim 23, further comprising adjusting a level in the wavelength-division multiplex optical signals so as to have substantially constant optical signal-to-noise ratios in the wavelength-division multiplex optical signals.

25. A method of increasing or decreasing the number of channels according to claim 23, wherein said wavelength-division multiplex signals are arranged in a plurality of wavelength bands.

26. A computer-readable recording medium wherein a program to be executed by a computer is recorded, said program used for activating an optical communication system comprising a plurality of optical repeater stations each having a corresponding optical amplifier for amplifying light, said optical repeater stations being between optical transmission lines wherein wavelength-division multiplex optical signals are transmitted, comprising:

generating, for each of the optical repeater stations, a desired slope in a desired wavelength range of a gain wavelength curve of the corresponding optical amplifier;

adjusting, for each of the optical repeater stations, an output of the corresponding optical amplifier to a desired output level; and adjusting a level in said wavelength-division multiplex optical signals so as to have substantially constant optical signal-to-noise ratios in the wavelength-division multiplex optical signals, wherein said generating and said adjusting are carried out in sequence from a first to a last one of the optical repeater stations.

27. An apparatus for activating an optical communication system comprising a plurality of optical repeater stations each having a corresponding optical amplifier for amplifying light, said optical repeater stations being between optical transmission lines wherein wavelength-division multiplex optical signals are transmitted, comprising:

means for generating, in each of the optical repeater stations, a desired slope in a desired wavelength range of a gain wavelength curve of the corresponding optical amplifier;

first means for adjusting, in each of the optical repeater stations, an output of the corresponding optical amplifier to a desired output level; and second means for adjusting a level in each of said wavelength-division multiplex optical signals so as to have substantially constant optical signal-to-noise ratios in the wavelength-division multiplex optical signals, wherein said generating means and first adjusting means in each of the optical repeater stations operate in sequence from a first to a last one of the optical repeater stations.

28. An apparatus for activating an optical communication system comprising a plurality of optical repeater stations each having a corresponding optical amplifier for amplifying light, said optical repeater stations being between optical transmission lines wherein wavelength-division multiplex optical signals are transmitted, comprising:

means for generating, in each of the optical repeater stations, a desired slope in a desired wavelength range of a gain wavelength curve of the corresponding optical amplifier;

first means for adjusting, in each of the optical repeater stations, an output of the corresponding optical amplifier to a desired output level; and second means for adjusting a level in each of said wavelength-division multiplex optical signals so as to have substantially constant optical signal-to-noise ratios in the wavelength-division multiplex optical signals, wherein said generating means and first adjusting means in each of the optical repeater stations operate in sequence from a first to a last one of the optical repeater stations, and wherein said second adjusting means includes:

means for creating a plurality of path groups by collecting said wavelength-division multiplex optical signals which are input to or output from same positions in said optical transmission lines, to be a single wavelength-division multiplex optical signal;

first means for pre-emphasizing said path groups, each of the path groups being considered a single wavelength-division multiplex optical signal; and second means for pre-emphasizing said wavelength-division multiplex optical signals in each of said path groups.

29. An apparatus for increasing or decreasing the number of channels in an optical communication system comprising a plurality of optical repeater stations each having a corresponding optical amplifier for amplifying light, said optical repeater stations being between optical transmission lines wherein wavelength-division multiplex optical signals are transmitted, each of the optical repeater stations comprising:
  means for performing wavelength-division multiplexing of an optical signal corresponding to a channel to be increased or decreased;
  means for generating a desired slope in a desired wavelength range of a gain wavelength curve of the corresponding optical amplifier; and
  means for adjusting an output of the corresponding optical amplifier to a desired output level,
  wherein said means for performing wavelength-division multiplexing and said means for generating a desired slope operate in sequence from a first to the last one of the optical repeater stations.

30. An apparatus for activating an optical communication system comprising a plurality of optical repeater stations each having a corresponding Raman amplifier for supplying pump light to Raman-amplify incoming light and an optical amplifier for amplifying outgoing light, said optical repeater stations being between optical transmission lines wherein wavelength-division multiplex signals are transmitted, each of the optical repeater stations comprising:
  means for supplying pump light of the corresponding Raman amplifier at a desired level;
  means for generating a desired slope in a desired wavelength range of a gain wavelength curve of the corresponding optical amplifier;
  first means for adjusting said pump light of the corresponding Raman amplifier so that levels in said wavelength-division multiplex optical signals become substantially equal to one another in said optical repeater stations;
  second means for adjusting an output of the corresponding optical amplifier to a level which is obtained by subtracting a sum of a level of amplified spontaneous emission generated by said adjusted pump light and a level of amplified spontaneous emission occurring in the corresponding optical amplifier from said desired output level; and
  third means for adjusting a level in said wavelength-division multiplex optical signals so as to have substantially constant optical signal-to-noise ratios in the wavelength-division multiplex optical signals,
  wherein said means for supplying, said means for generating, and said first and second means for adjusting operate in sequence from a first to a last one of the optical repeater stations.

31. An apparatus for increasing or decreasing the number of channels in an optical communication system comprising a plurality of optical repeater stations each having a corresponding Raman amplifier for supplying pump light to Raman-amplify incoming light and an optical amplifier for amplifying outgoing light, said optical repeater stations being between optical transmission lines wherein wavelength-division multiplex optical signals are transmitted, each of the optical repeater stations comprising:
  means for performing wavelength-division multiplexing of an optical signal corresponding to a channel to be increased or decreased;
  means for generating a desired slope in a desired wavelength range of a gain wavelength curve of the corresponding optical amplifier;
  first means for adjusting pump light of the corresponding Raman amplifier so that levels in said wavelength-division multiplex optical signals become substantially equal to one another in each of said optical repeater stations, said levels being obtained by subtracting a pre-emphasis amount given to said wavelength-division multiplex optical signals before a channel increase or decrease; and
  second means for adjusting an output of the corresponding optical amplifier to a level which is obtained by subtracting a sum of a level of amplified spontaneous emission generated by said adjusted pump light and a level of amplified spontaneous emission occurring in the corresponding optical amplifier from said desired output level,
  wherein said means for performing wavelength-division multiplexing, said means for generating a desired slope and said first and second means for adjusting operate in sequence from a first to a last one of the optical repeater stations.

* * * * *

UNITED STATES PATENT AND TRADEMARK OFFICE
CERTIFICATE OF CORRECTION

PATENT NO. : 6,839,160 B2
DATED : January 4, 2005
INVENTOR(S) : Takashi Tsuda et al.

It is certified that error appears in the above-identified patent and that said Letters Patent is hereby corrected as shown below:

Column 37,
Lines 29 and 54, change "," to -- ; --.

Signed and Sealed this

Seventh Day of June, 2005

JON W. DUDAS
*Director of the United States Patent and Trademark Office*